(12) United States Patent
Kikuchi

(10) Patent No.: US 6,227,973 B1
(45) Date of Patent: May 8, 2001

(54) VIDEO GAME SYSTEM USING TERRAIN PROFILE INFORMATION

(75) Inventor: Yuji Kikuchi, Chiba-ken (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 08/841,505

(22) Filed: Apr. 23, 1997

(30) Foreign Application Priority Data

May 10, 1996 (JP) .................................................... 8-140629

(51) Int. Cl.[7] .............................. A63F 13/00; A63F 9/24; G06F 17/00; G06F 19/00
(52) U.S. Cl. ................................. 463/31; 463/1; 463/30; 463/32; 463/37; 273/317.1; 273/317.2; 273/108.2; 345/429; 345/425; 345/127; 345/131; 345/76; 345/77
(58) Field of Search ................................. 463/31, 37, 32, 463/4, 3, 5, 30; 273/317.1, 108.2, 317.2; 345/429, 425, 27, 33, 76, 77, 90, 127, 131, 418; 700/91, 92, 93, 90

(56) References Cited

U.S. PATENT DOCUMENTS

Re. 33,662 * 8/1991 Blair et al. ....................... 364/410 X
4,655,451 * 4/1987 Townsley ........................... 273/32 H
5,146,557 * 9/1992 Yamrom et al. .................. 395/161 X
5,319,548 * 6/1994 Germain ........................... 364/410 X

* cited by examiner

Primary Examiner—Jessica J. Harrison
Assistant Examiner—Binh-An D. Nguyen
(74) Attorney, Agent, or Firm—Jordan and Hamburg LLP

(57) ABSTRACT

A video game system for simulating a golf game displays three-dimensional image information indicative of the terrain profile of a golf course and image information of a golf ball on the display screen of a television monitor. The golf ball is moved on the display screen based on the image information indicative of the terrain profile and a command from a controller operated by the game player. A guide comprising a matrix of lines is displayed on the display screen, and the luminance and length of each of said lines are established based on the image information indicative of the terrain profile. The guide is three-dimensionally displayed over the three-dimensional image information indicative of the terrain profile on said display screen. The three-dimensionally displayed guide allows the game player to visually recognize heights and distances of various areas of the golf course in an intuitive fashion, and hence allows the game player to operate the controller in a manner to match terrain features of the golf course in the game space.

37 Claims, 26 Drawing Sheets

(0, 530) (200, 530)

Gr
Ar

Tg (0, 0) (200, 0)

Gu2

Yh  Va
Ha  Yv
     Ba

Y1
Gu3  max
     min
Y2

| POLYGON VERTEX NO. | X | Y | Z | Lu |
|---|---|---|---|---|
| 0 | 0 | 0 | 0 | 0 |
| ⁞ | ⁞ | ⁞ | ⁞ | ⁞ |
| n | 200 | 500 | 0 | 0 |

VIDEO GAME SYSTEM USING TERRAIN PROFILE INFORMATION

BACKGROUND OF THE INVENTION

1. Field of the Invention

The present invention relates to a video game system using terrain profile or topographical information which operates according to game program data stored in a recording medium such as an optical disk, a magnetic disk, a cassette with a built-in semiconductor memory, or the like, and more particularly to a method of representing a distance or height in a display space and a method of displaying a guide in a display space in a video game system using terrain profile information, and a recording medium for use in such a video game system.

2. Description of the Prior Art

Various video game systems which have been proposed in the art include video game systems comprising a combination of a video game machine designed for home use and a television monitor, video game systems designed as video game machines for business use, and video game systems comprising a combination of a personal computer or work station, a display unit, and an audio output unit. These video game systems commonly comprise a controller which can manually be operated by a game player, a recording medium which stores game program data, a central processing unit (CPU) for performing a control process based on the game program data to generate graphic data and audio data, a graphic processor for generating graphic images to be displayed, an audio processor for generating sounds to be outputted, a cathode-ray tube (CRT) for displaying graphic images, and a speaker for outputting sounds. The recording medium may typically be a CD-ROM, a semiconductor memory, a cassette with a built-in semiconductor memory, or the like.

Graphic images generated by the graphic processor and displayed on the CRT will be described below. There are known many different types of video games in the art. However, graphic images generated and displayed in such video games are generally constructed of a controllable image which is variable by commands entered into the controller by the game player and a background image which is either still or variable depending on those commands. Variable background images include background images used to simply give the game player visual changes in the displayed overlay and background images used as a condition for giving the game player an achievement such as a score or the like. One example of the latter background images is a game environment such as a golf course in a golf game.

In a golf game played on a video game system, an image of a golf course and an image of a golfer are displayed in a golf game space on the display screen of a television monitor. When the game player operates the controller of the video game system, the golfer in the golf game space visually moves and swings the golf club to hit the golf ball, which visually flies back into the golf game space. The golfer in the golf game space visually simulates a human golfer as he or she actually plays a golf game on an actual golf course. Therefore, the golf game on the video game system allows the game player to visually simulate playing golf by changing images displayed on the display screen according to commands which are entered into the controller by the game player.

The graphic image of a golf course is related to height data of various areas of the golf course. Based on a command which is entered into the controller by the game player and the height data of the golf course, the CPU calculates a distance which the golf ball is to fly in the golf game space, and then displays the golf ball as traversing the calculated distance. For example, when the golf ball is located in a very low position in the golf game space, if the game player operates the controller to cause the simulated golfer to hit the golf ball weakly toward a very high position in the golf game space, then the golf ball does not move to a position in the golf game space which is intended by the game player. The height data of various areas of the golf course are used in order to give the game player a visual perception as close to actual golf games as possible.

In video games, such as a golf game, where height data are related to various background image areas, it is necessary to display the accurate height of such background image areas so as to allow the game player to operate the controller appropriately. Unless the height of background image areas such as golf course areas is displayed in a certain form, the game player is given no visual basis for operating the controller appropriately.

SUMMARY OF THE INVENTION

It is therefore an object of the present invention to provide a video game system which will give the game player a simple and accurate operation guide in a video game where height data are related to background image areas.

According to an aspect of the present invention, there is provided a method of representing a distance or height in a display space, comprising the steps of displaying image information indicative of a terrain profile including at least the height of a vertex on a display screen, displaying lines between vertices present in a predetermined range of the image information on the display screen, and establishing a luminance of each of the lines depending on the relationship between the height of a vertex corresponding to a starting point of the line and the height of a vertex corresponding to an ending point of the line.

According to another aspect of the present invention, there is provided a method of displaying a guide in a display space in a video game system for displaying image information indicative of a terrain profile and image information of a movable object on a display screen, and moving the movable object on the display screen based on the image information indicative of the terrain profile and a command from a controller, comprising the steps of displaying a guide comprising a plurality of lines on the display screen, and establishing a luminance and a length of each of the lines based on the image information indicative of the terrain profile.

According to still another aspect of the present invention, there is provided a method of displaying a guide in a display space in a video game system for displaying image information indicative of a terrain profile and image information of a movable object on a display screen, and moving the movable object on the display screen based on the image information indicative of the terrain profile and a command from a controller, comprising the step of displaying a guide comprising a plurality of lines on the display screen based on the image information indicative of the terrain profile, if the command from the controller indicates display of the guide.

According to yet still another aspect of the present invention, there is provided a video game system comprising display means for displaying image information of a terrain profile and image information of a movable object movable on the terrain profile on a display screen, controller means for entering commands, and control means for moving the movable object displayed on the display screen based on the image information of the terrain profile and a command from the controller means, the control means comprising address establishing means for establishing minimum and maximum addresses of the terrain profile on the display screen, address acquiring means for acquiring minimum and maximum addresses of a display range in which a guide indicative of terrain features based on the image information of the terrain profile is displayed over the terrain profile, height data correcting means for correcting height data indicative of heights of portion of the terrain profile in the display range based on a height of the position of the movable object, and guide display means for displaying the guide over the terrain profile with a luminance based on the corrected height data.

According to a further aspect of the present invention, there is also provided a recording medium having recorded therein program data for displaying image information indicative of a terrain profile including at least the height of a vertex on a display screen, displaying lines between vertices present in a predetermined range of the image information on the display screen, and establishing a luminance of each of the lines depending on the relationship between the height of a vertex corresponding to a starting point of the line and the height of a vertex corresponding to an ending point of the line.

According to a still further aspect of the present invention, there is provided a recording medium having recorded therein game program data for displaying image information indicative of a terrain profile and image information of a movable object on a display screen, moving the movable object on the display screen based on the image information indicative of the terrain profile and a command from a controller, displaying a guide comprising a plurality of lines on the display screen, and establishing a luminance and a length of each of the lines based on the image information indicative of the terrain profile.

According to a yet still further aspect of the present invention, there is provided a recording medium having recorded therein game program data for displaying image information indicative of a terrain profile and image information of a movable object on a display screen and moving the movable object on the display screen based on the image information indicative of the terrain profile and a command from a controller, the game program including the step of displaying a guide comprising a plurality of lines on the display screen based on the image information indicative of the terrain profile, if the command from the controller indicates display of the guide.

According to another aspect of the present invention, there is further provided a method of establishing a hitting position for hitting a movable object thereby to move the movable object in a game space of a video game system in response to operation of a controller by a game player, comprising the steps of displaying the movable object at a fixed position in the game space, displaying a horizontal position establishing image for horizontal movement with respect to the movable object, storing a horizontal position of the horizontal position establishing image when the game player presses a corresponding button on the controller, displaying a vertical position establishing image for vertical movement with respect to the movable object, storing a vertical position of the vertical position establishing image when the game player presses a corresponding button on the controller, and determining the horizontal position and the vertical position as a hitting position for hitting the movable object when the game player operates the controller to hit the movable object in the game space.

According to still another aspect of the present invention, there is provided a video game system for hitting a movable object thereby to move the movable object in a game space response to operation of a controller by a game player, comprising means for displaying the movable object at a fixed position in the game space, image display means for displaying horizontal and vertical position establishing images for horizontal and vertical movement with respect to the movable object, storage means for storing horizontal and vertical positions of the respective horizontal and vertical position establishing images when the game player presses corresponding buttons on the controller, and position determining means for determining the horizontal and vertical positions as a hitting position for hitting the movable object when the game player operates the controller to hit the movable object in the game space.

According to yet sill another aspect of the present invention, there is provided a recording medium readable by a computer and having recorded therein game program data of a video game for hitting a movable object thereby to move the movable object in a game space response to operation of a controller by a game player, the game program data comprising the steps of displaying the movable object at a fixed position in the game space, displaying a horizontal position establishing image for horizontal movement with respect to the movable object, storing a horizontal position of the horizontal position establishing image when the game player presses a corresponding button on the controller, displaying a vertical position establishing image for vertical movement with respect to the movable object, storing a vertical position of the vertical position establishing image when the game player presses a corresponding button on the controller, and determining the horizontal position and the vertical position as a hitting position for hitting the movable object when the game player operates the controller to hit the movable object in the game space.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
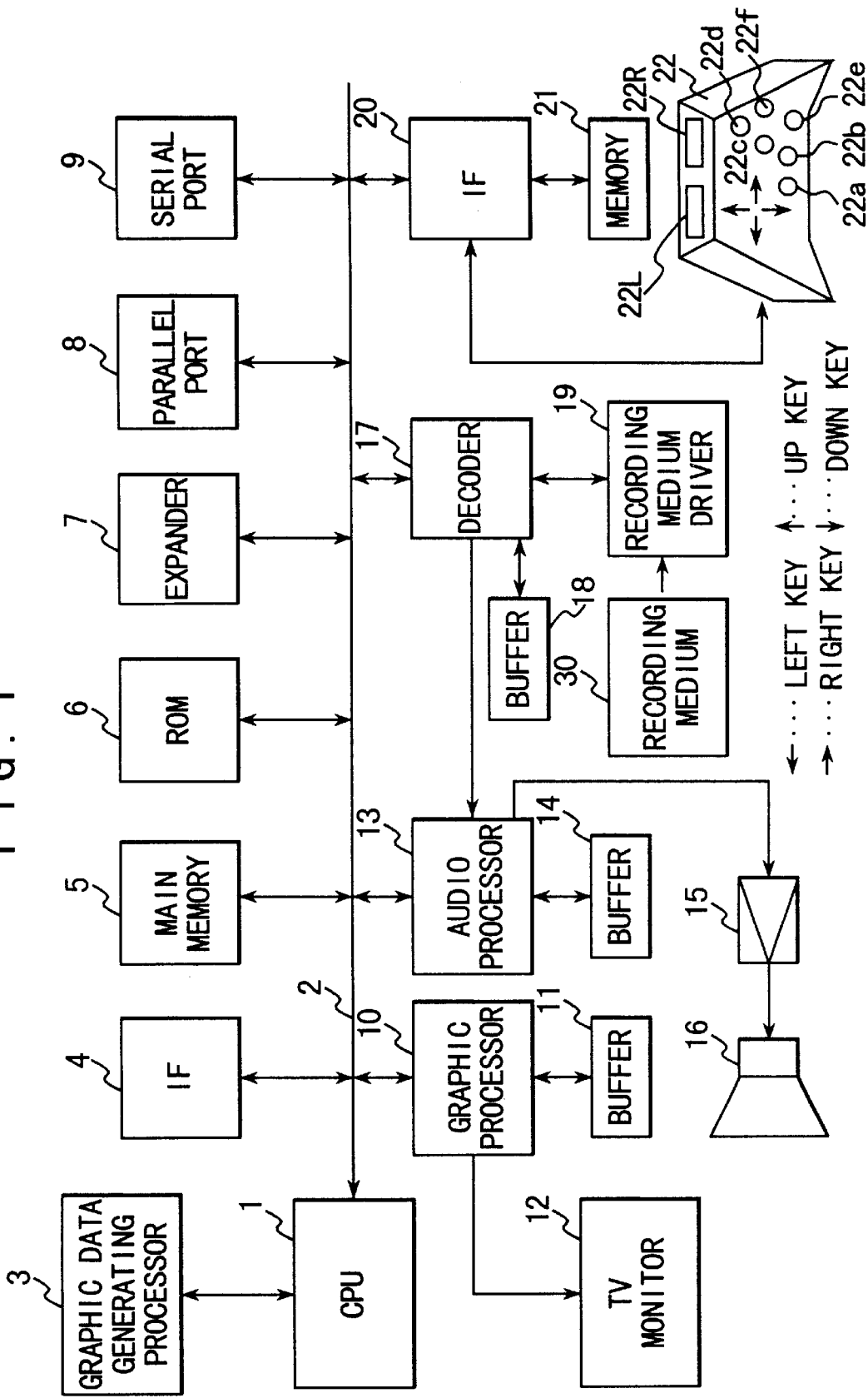
FIG. 1 is a block diagram of a video game system according to the present invention.

As shown in FIG. 1, a video game system according to the present invention, which is played by a game player to play a video game, typically a golf game, generally comprises a game machine assembly and a recording medium 30 which stores game program data. The game machine assembly comprises a CPU 1, a bus 2 connected to the CPU 1 and comprising an address bus, a data bus, and a control bus, a graphic data generating processor 3 connected to the CPU 1, an interface 4 connected to the bus 2, a main memory 5 connected to the bus 2, a read-only memory (ROM) 6 connected to the bus 2, an expander 7 connected to the bus 2, a parallel port 8 connected to the bus 2, a serial port 9 connected to the bus 2, a graphic processor 10 connected to the bus 2, a buffer 11 connected to the graphic processor 10, a television monitor 12 connected to the graphic processor 10, an audio processor 13 connected to the bus 2, a buffer 14 connected to the audio processor 13, an amplifier 15 connected to the audio processor 13, a speaker 16 connected to the amplifier 15, a decoder 17 connected to the bus 2, a buffer 18 connected to the decoder 17, a recording medium driver 19 connected to the decoder 17, an interface 20 connected to the bus 2, a memory 21 connected to the interface 20, and a controller 22 connected to the interface 20.

The video game system may take different system configurations depending on the manner in which it is used. If the video game system is used as a video game system for home use, for example, then the television monitor 12 and the speaker 16 are separate from the other parts of the game machine assembly. If the video game system is used as a video game system for business use, for example, then all the parts shown in FIG. 1 are assembled as a unit and encased in a single housing. If the video game system is constructed around a personal computer or a work station, then the television monitor 12 corresponds the display monitor of the computer, the graphic processor 10, the audio processor 13, and the expander 7 correspond to part of the game program data stored in the recording medium 30 or a hardware arrangement on an expansion board inserted in an expansion slot of the computer, and the interface 4, the parallel port 8, the serial port 9, and the interface 20 correspond to a hardware arrangement on an expansion board inserted in an expansion slot of the computer. The buffers 11, 14, 18 correspond to respective areas of the main memory 5 or an expansion memory (not shown). In the illustrated embodiment, the video game system will be described as a video game system for home use.

The various parts of the video game system shown in FIG. 1 will be described below. The graphic data generating processor 3 serves as a coprocessor of the CPU 1. The graphic data generating processor 3 carries out coordinate transformations, light source calculations, and matrixes and vectors of fixed point by way of parallel processing. Main processing tasks of the graphic data generating processor 3 include a process for determining address data in a display area of an image being processed, based on coordinate data, linear displacement data, and angular displacement data of each vertex in a two- or three-dimensional plane of image data supplied from the CPU 1, and returning the determined address data to the CPU 1, and a process of calculating the luminance of an image depending on the distance from a light source which is hypothetically established.

The interface 4 serves as an interface for use with a peripheral device such as a pointing device such as a mouse, a track ball, or the like. The ROM 6 stores game program data as an operating system for the video game system. The game program data in the ROM 6 correspond to a BIOS (Basic Input Output System) in a personal computer.

The expander 7 serves to expand graphic image data compressed by an intracoding process according to the MPEG (Moving Pictures Experts Group) standard and the JPEG (Joint Photographic Experts Group) standard. Expanding processes carried out by the expander 7 include a decoding process for decoding data encoded by a VLC (Variable Length Coding) process, an inverse quantizing process, an IDCT (Inverse Discrete Cosine Transform) process, and a decoding process of decoding intracoded images, among others.

The graphic processor 10 effects a graphic processing on data contained in the buffer 11 based on graphic commands issued from the CPU 1. The buffer 11 has a display area and a non-display area. The display area is an area for storing data to be displayed on the display screen of the television monitor 12, and the non-display area is an area for storing texture data, color palette data, etc. The texture data are two-dimensional image data. The color palette data are data for indicating colors of the texture data. These data are transferred beforehand from the recording medium 30 to the non-display area of the buffer 11 by the CPU 1 in one cycle or a plurality of cycles in synchronism with the progress of the video game.

Graphic commands issued from the CPU 1 include, for example, a graphic command for displaying a line, a graphic command for displaying a three-dimensional image using polygons, and a graphic command for displaying an ordinary two-dimensional image. Polygons are polygonal two-dimensional images which may be of a triangular or rectangular shape.

The graphic command for displaying a line comprises addresses for starting and ending displaying a line, and data representing the color of the line and the displaying of the line. The graphic command for displaying a line is issued from the CPU 1 directly to the graphic processor 10.

The graphic command for displaying a three-dimensional image using polygons comprises polygon vertex address data in the display area of the buffer 11, texture address data indicative of a storage position in the buffer 11 of texture data to be mapped onto polygons, color palette address data indicative of a storage position in the buffer 11 of color palette data representing a color of the texture data, and luminance data indicative of a luminance of the texture data. Of these data, the polygon vertex address data comprises x and y coordinate data of polygon vertex coordinate data which are newly produced when polygon vertex coordinate data in a three-dimensional space from the CPU 1 are transformed by the graphic data generating processor 3 based on linear displacement data and angular displacement data from the CPU 1. The luminance data are determined by the graphic data generating processor 3 based on the distance from a position indicated by the transformed polygon vertex coordinate data to a hypothetically positioned light source.

The polygon vertex address data represents addresses in the display area of the buffer 11. The graphic processor 10 writes texture data in a range of the display area of the buffer 11 which is represented by three or four polygon vertex address data. Such a writing process is generally referred to as "texture mapping".

One displayed object is constructed of a number of polygons. The CPU 1 holds coordinate data in a three-dimensional space of each of the polygons in the main memory 5. For moving the object on the display screen with the controller 22, i.e., for expressing a movement of the object or changing a position (viewpoint) from which the object is viewed, the CPU 1, the graphic data generating processor 3, and the graphic processor 10 carry out the following process: The CPU 1 supplies the graphic data generating processor 3 with three-dimensional coordinate data of the vertices of each of the polygons in the main memory 5, and linear and angular displacement data of each of the polygons. Based on the three-dimensional coordinate data of the vertices of each of the polygons and the linear and angular displacement data of each of the polygons, the graphic data generating processor 3 determines three-dimensional coordinate data of each of the polygons after they are linearly and angularly displaced. The determined three-dimensional coordinate data of each of the polygons are converted to two-dimensional coordinate data as horizontal and vertical coordinate data. The horizontal and vertical coordinate data are supplied as address data in the display area of the buffer 11, i.e., polygon vertex address data, to the graphic processor 10. The graphic processor 10 then maps texture data represented by preassigned texture address data onto a triangular or a rectangular range of the display area of the buffer 11 which is represented by three or four polygon vertex address data. The display screen of the television monitor 12 now displays an object with texture data mapped onto a number of polygons which the object is constructed of.

The graphic command for displaying an ordinary two-dimensional image comprises vertex address data, texture address data, color palette address data indicative of a storage position in the buffer 11 of color palette data representing a color of the texture data, and luminance data indicative of a luminance of the texture data. Of these data, the vertex address data comprises coordinate data produced when vertex coordinate data in a two-dimensional space from the CPU 1 are transformed by the graphic data generating processor 3 based on linear displacement data and angular displacement data from the CPU 1.

The audio processor 13 stores ADPCM data read from the recording medium 30 in the buffer 14 and uses the ADPCM data stored in the buffer 14 as a sound source. The audio processor 13 reads the ADPCM data with a clock having a frequency of 44.1 kHz, for example, from the buffer 14. The audio processor 13 then processes the ADPCM data read from the buffer 14, for pitch conversion, noise addition, envelope setting, level setting, reverberation addition, etc. If audio data read from the recording medium 30 are PCM data, then the audio processor 13 converts the PCM data to ADPCM data. PCM data are processed by the video program data directly in the main memory 5. The PCM data processed in the main memory 5 are supplied to the audio processor 13, which converts the PCM data to ADPCM data, processes the ADPCM data as described above, and outputs the ADPCM data as sounds from the speaker 16.

The recording medium driver 19 may comprise a hard disk drive, an optical disk drive, a flexible disk drive, a silicon disk drive, a cassette reader, or the like, and the recording medium 30 may comprise a hard disk, an optical disk, a flexible disk, a semiconductor memory, or the like. The recording medium driver 19 reads graphic image data, audio data, and game program data from the recording medium 30, and supplies the read data to the decoder 17. The decoder 17 effects an error-correcting process on the data from the recording medium driver 19 with an ECC (Error-Correcting Code), and supplies the error-corrected data to the main memory 5 or the audio processor 13.

The memory 21 comprises a holder and a card-type memory. The card-type memory serves to hold various parameters of the game, e.g., to hold a game status when the game comes to an end. The controller 22 has arrow keys including a left key L, a right key R, an up key U, and a down key D, a left button 22L, a right button 22R, a start button 22a, a select button 22b, a first button 22c, a second button 22d, a third button 22e, and a fourth button 22f. The arrow keys are used by the game player to give the CPU 1 commands indicative of upward, downward, leftward, and rightward directions. The start button 21a is used by the game player to instruct the CPU 1 to start the game program data loaded from the recording medium 30. The select button 22b is used by the game player to instruct the CPU 1 to make various selections relative to the game program data which are loaded from the recording medium 30 to the main memory 5. The left key 22L, the right key 22R, the first~fourth buttons 22c, 22d, 22e, 22f have functions which differ depending on the game program data which are loaded from the recording medium 30.

Operation of the video game system will briefly be described below. When a power supply switch (not shown) of the video game system is turned on, the video game system is energized. If the recording medium 30 is inserted in the recording medium driver 19, then the CPU 1 instructs the recording medium driver 19 to read the game program data from the recording medium 30 based on the operating system stored in the ROM 6. The recording medium driver 19 then reads the graphic image data, audio data, and game program data from the recording medium 30. The graphic image data, audio data, and game program data that are read are supplied to the decoder 17, which effects an error-correcting process on the supplied data. The error-corrected data are supplied through the bus 2 to the expander 7, which expands the data. The expanded data are then supplied to the graphic processor 10, and written in the non-display area of the buffer 11 by the graphic processor 10.

The audio data that have been error-corrected by the decoder 17 are supplied to the main memory 5 or the audio processor 13, and stored in the main memory 5 or the buffer 14. The game program data that have been error-corrected by the decoder 17 are supplied to and stored in the main memory 5. Subsequently, the CPU 1 executes the video game based on the game program data stored in the main memory 5 and commands entered into the controller 22 by the game player. Specifically, the CPU 1 controls image processing, audio processing, and internal processing operations based on commands entered into the controller 22 by the game player. In the image processing operation, two- or three-dimensional coordinate data and viewpoint position data are supplied to the graphic data generating processor 3, and graphic commands including address data in the display area of the buffer 11, determined by the graphic data generating processor 3, and luminance data are issued. In the audio processing operation, an audio output command is issued to the audio processor 13 and level, reverberation, and other settings are indicated. In the internal processing operation, calculations are carried out based on commands entered into the controller 22 by the game player.

Figure 2:
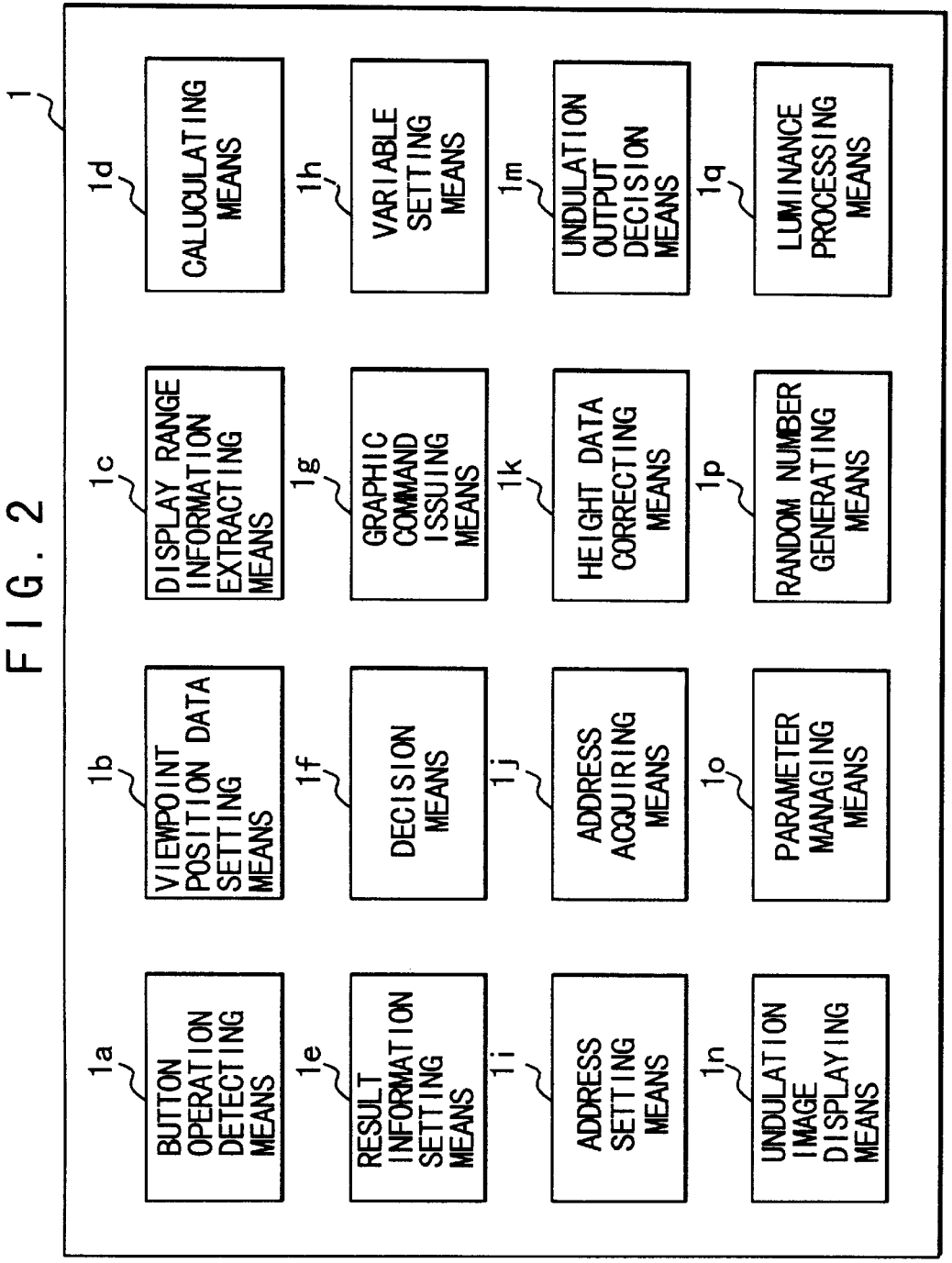
FIG. 2 is a block diagram showing functions performed by a CPU in the video game system shown in FIG. 1.

FIG. 2 shows function or meanss which are performed by the CPU 1 shown in FIG. 1. The CPU 1 performs the functions or means shown in FIG. 2 when it reads the game program data which have been read from the recording medium 30 and stored in the main memory 5. As shown in FIG. 2, the functions or means performed by the CPU 1 include a button operation detecting function or means $1a$, a viewpoint position data setting function or means $1b$, a display range information extracting function or means $1c$, a calculating function or means $1d$, a result information setting function or means $1e$, a decision function or means $1f$, a graphic command issuing function or means $1g$, a variable setting function or means $1h$, an address setting function or means $1i$, an address acquiring function or means $1j$, a height data correcting function or means $1k$, an undulation output decision function or means $1m$, an undulation image displaying function or means $1n$, a parameter managing function or means $1o$, a random number generating function or means $1p$, and a luminance processing function or means $1q$.

Figure 3A:
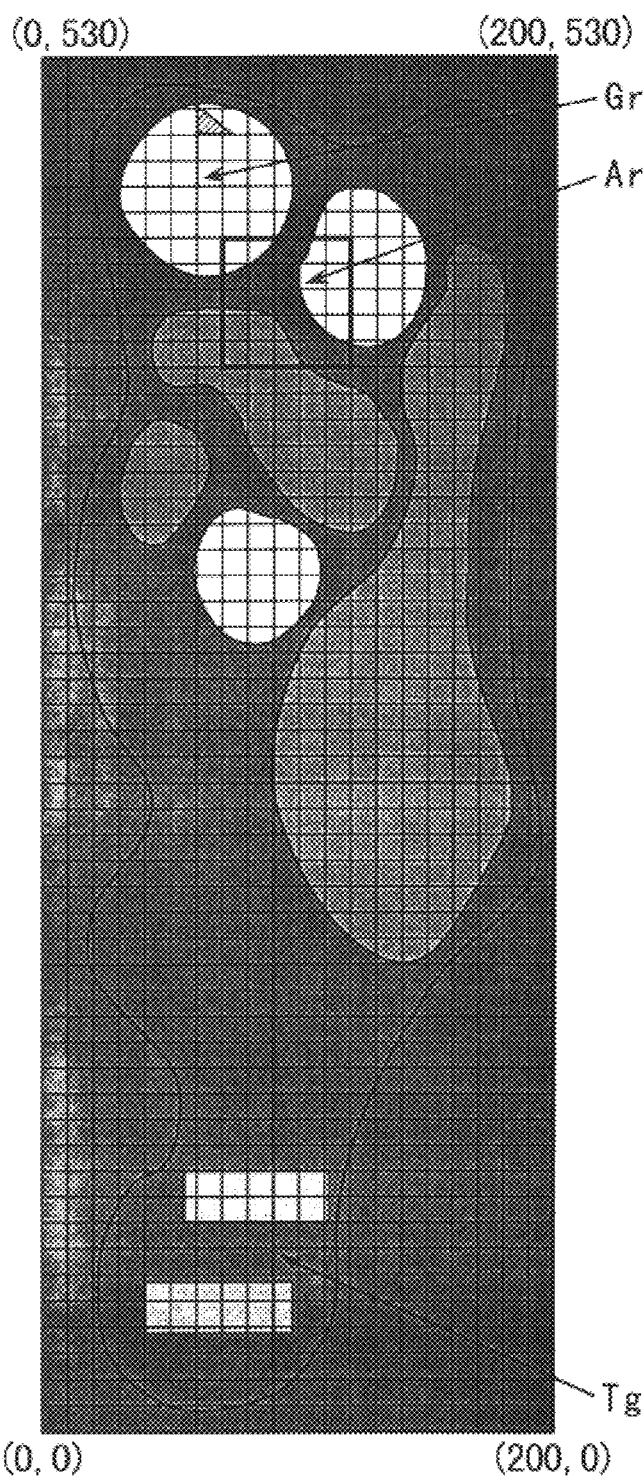
FIGS. 3A through 3D are views of a golf course displayed in a golf game played on the video game system shown in FIG. 1.

FIG. 3A shows a golf course displayed in a golf game played on the video game system shown in FIG. 1. The golf course which includes a tee ground Tg and a green Gr comprises a matrix of regions defined by vertical and horizontal lines. Points of intersection of the vertical and horizontal lines are given respective addresses (X, Y) ranging from minimum addresses (0, 0) to maximum addresses (200, 530). Address data are related to texture number data and recorded in the recording medium 30.

Figures 4A, 4B:
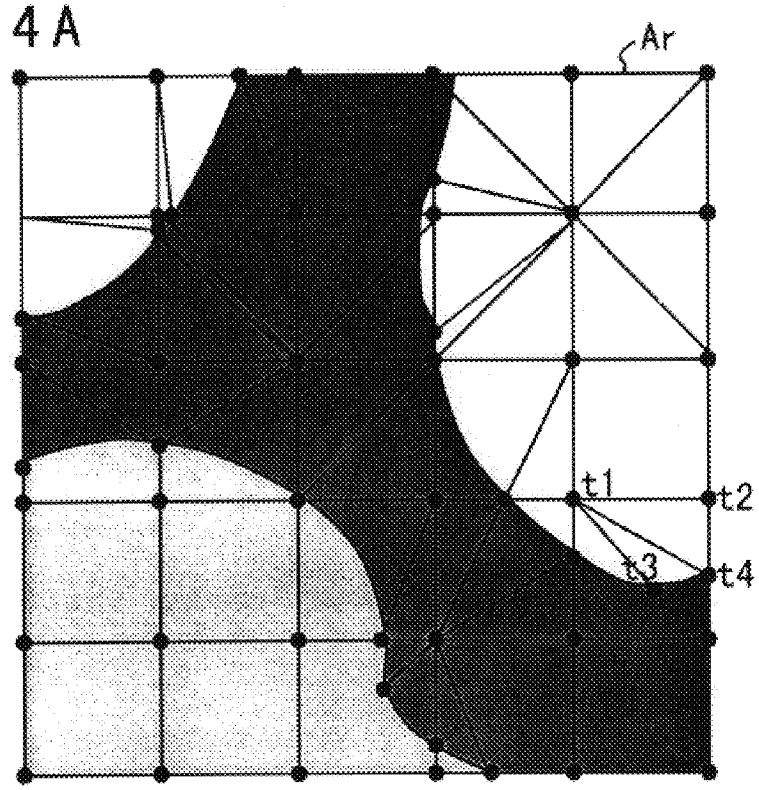
FIG. 4A is an enlarged view of an area extracted from the golf course shown in FIG. 3A.
FIG. 4B is a table of coordinate, height, and luminance data of polygon vertices of areas of the golf course shown in FIG. 3A.

FIG. 4A shows at an enlarged scale an area Ar1 which has been extracted from the golf course shown in FIG. 3A based on viewpoint position data. The extracted area Ar1 shown in FIG. 4A contains more displayed information than the golf course shown in FIG. 3A. As shown in FIG. 4A, the golf course comprises a number of triangular and rectangular polygons whose vertices are represented by black dots in FIG. 4A. Height data of these vertices are also related to texture number data and recorded in the recording medium 30. The graphic data generating processor 3 shown in FIG. 1 effects light source calculations for the golf course based on the height data, and establishes values of luminance data of each texture. Since the light source of the golf course is established above the golf course, the distance from the golf course to the light source is based on the height data.

FIG. 4B shows a data table for the golf course. There is one data table for one golf course. As shown in FIG. 4B, the data table contains polygon vertex number data 0~n, horizontal address data X registered in association with the polygon vertex number data 0~n, vertical address data Y registered in association with the polygon vertex number data 0~n, height data Z registered in association with the polygon vertex number data 0~n, and luminance data Lu registered in association with the polygon vertex number data 0~n. The height data registered in the data table are corrected and rewritten from time to time with respect to the position of the golf ball. The luminance data Lu are calculated by the luminance processing means $1q$ based on the corrected height table and registered in the data table. The luminance data Lu registered in the data table are supplied, together with the texture address data, etc. as a graphic command to the graphic processor 10 shown in FIG. 1. The graphic processor 10 displays on the television monitor 12 the data to be displayed with a luminance represented by the luminance data contained in the graphic command.

The polygon vertex number data represent index numbers of polygon vertices indicated by the black dots in FIG. 4A. The horizontal and vertical address data X, Y represent the addresses (X, Y) shown in FIG. 3A.

Figure 5:
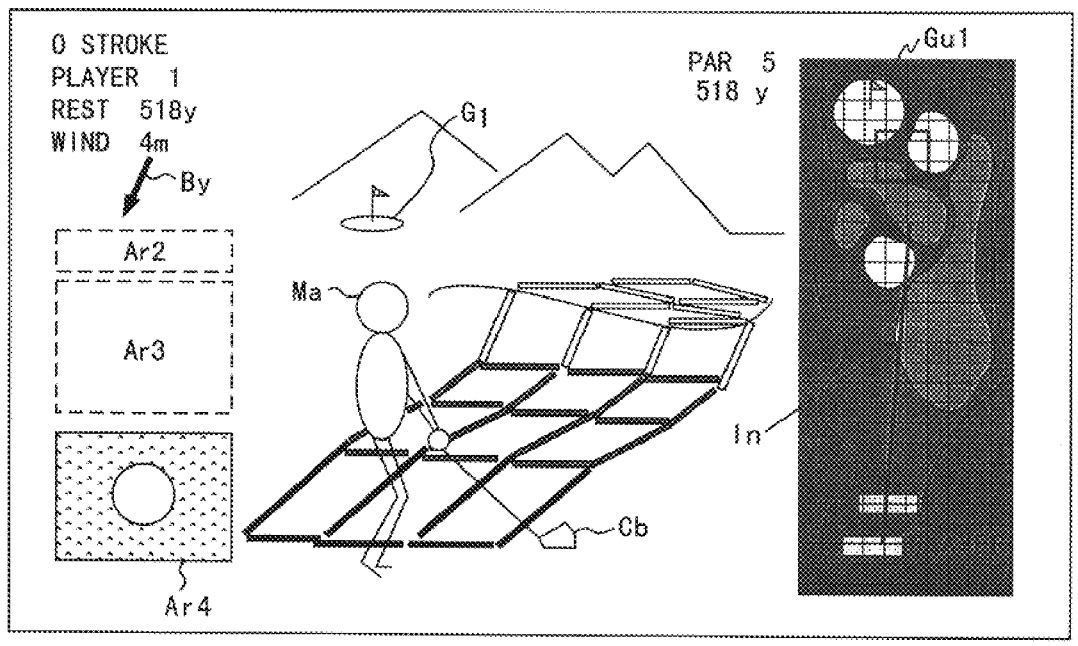
FIG. 5 is a view of a graphic image displayed on the display screen of the video game system shown in FIG. 1.

FIG. 5 shows a graphic image displayed on the display screen of the television monitor 12 of the video game system shown in FIG. 1. As shown in FIG. 5, the displayed graphic image includes an upper left display area for displaying character information, display areas Ar2, Ar3, Ar4, a central display area for displaying a golfer Ma, a golf course, and a guide Gu2, and a right display area for displaying a guide Gu1.

The character information displayed in the upper left display area comprises vertically successive lines of characters including characters (e.g., 0 STROKE) representative of the number of strokes, characters (e.g., PLAYER 1) representative of a player number (among plural players), characters (e.g., REST 518y) representative of a remaining distance, characters (e.g., WIND 4m) representative of a wind speed, and a symbol representative of a wind direction as indicated by the arrow By.

The display area A2, immediately below the displayed character information, displays titles of settings to be established, e.g., a golf club, teeing-up, a hitting position, etc. The display area A3, below the display area A2, displays an image, e.g., a golf club, of each of the settings to be established.

The guide Gu1 displayed in the right display area includes an indicator image In that indicates the distance which the golf ball has flied and the position which the golf ball has reached. The indicator image In changes its display state depending on the above settings.

The display area Ar4, below the display area A3, displays the graphic image of the golf ball and the ground around the golf ball.

The central display area displays the golfer Ma with a golf club Cb, a golf course such as a green Gr or the like, and the guide Gu2 as extending from the position of the golfer Ma or the position of the golf ball in the direction in which the golf ball is hit by the golf club Cb. The guide Gu2 is displayed as a three dimensional image which matches terrain profile or topographical features of the golf course from the position of the golfer Ma or the position of the golf ball, as shown in FIG. 5. The guide Gu2 is displayed with a luminance that varies depending on the height of the golf course therebeneath. For example, as the height of the golf course beneath the guide Gu2 is smaller, the luminance of the guide Gu2 is lower, and as the height of the golf course beneath the guide Gu2 is larger, the luminance of the guide Gu2 is higher. Since the luminance of the displayed guide Gu2 varies depending on the height of the golf course therebeneath, the game player can recognize the height of the golf course by seeing the displayed guide Gu2, and can carry out a golf game depending on the terrain profile of the golf course as by establishing a higher or lower setting for hitting the golf ball with the controller 22.

The guide Gu2 comprises a matrix of straight lines displayed between the vertices of polygons representative of the golf course topography by the graphic processor 10 based on graphic commands for displaying lines. The graphic commands for displaying lines contain luminance data of the polygon vertices. The graphic processor 10 determines the luminance of a line to be displayed based on the luminance of a polygon vertex which corresponds to the starting point of the line and the luminance of a polygon vertex which corresponds to the ending point of the line. If the luminance of the starting point of a line to be displayed is higher than the luminance of the ending point of the line, then the graphic processor 10 determines the luminance of the line such that it is highest at the starting point and is progressively lower toward the ending point. Conversely, if the luminance of the starting point of a line to be displayed is lower than the luminance of the ending point of the line, then the graphic processor 10 determines the luminance of the line such that it is lowest at the starting point and is progressively higher toward the ending point. In FIG. 5, however, such luminance gradations in each of the lines of the guide Gu2 are not illustrated for the sake of brevity.

As described above, the graphic image of the golf course is related to height data of various areas of the golf course. The graphic data generating processor 3 carries out light source calculations based on the height data and the position of a hypothetical light source placed at a viewpoint, and establishes luminances for the various areas of the golf course based on the results of the light source calculations. Therefore, the displayed golf course itself can express to a certain extent distances within and heights of the golf course. However, such distances within and heights of the golf course which are represented only by the differences between the calculated luminances are not sufficient to provide an effective guide for the game player to operate the controller 22. According to the present invention, the guide Gu2 is additionally displayed to assist the game player in operating the controller 22. The straight lines of the guide Gu2 have their luminances depending on the heights of the corresponding areas of the golf course and have their lengths depending on the distances or lengths of the corresponding areas of the golf course. Accordingly, the game player can visually recognize the heights and distances of the various areas of the golf course in an intuitive fashion simply by viewing the guide Gu2, and as a result can operate the controller 22 in a manner to match topographical or terrain features of the golf course in a displayed golf game space.

Figure 6:
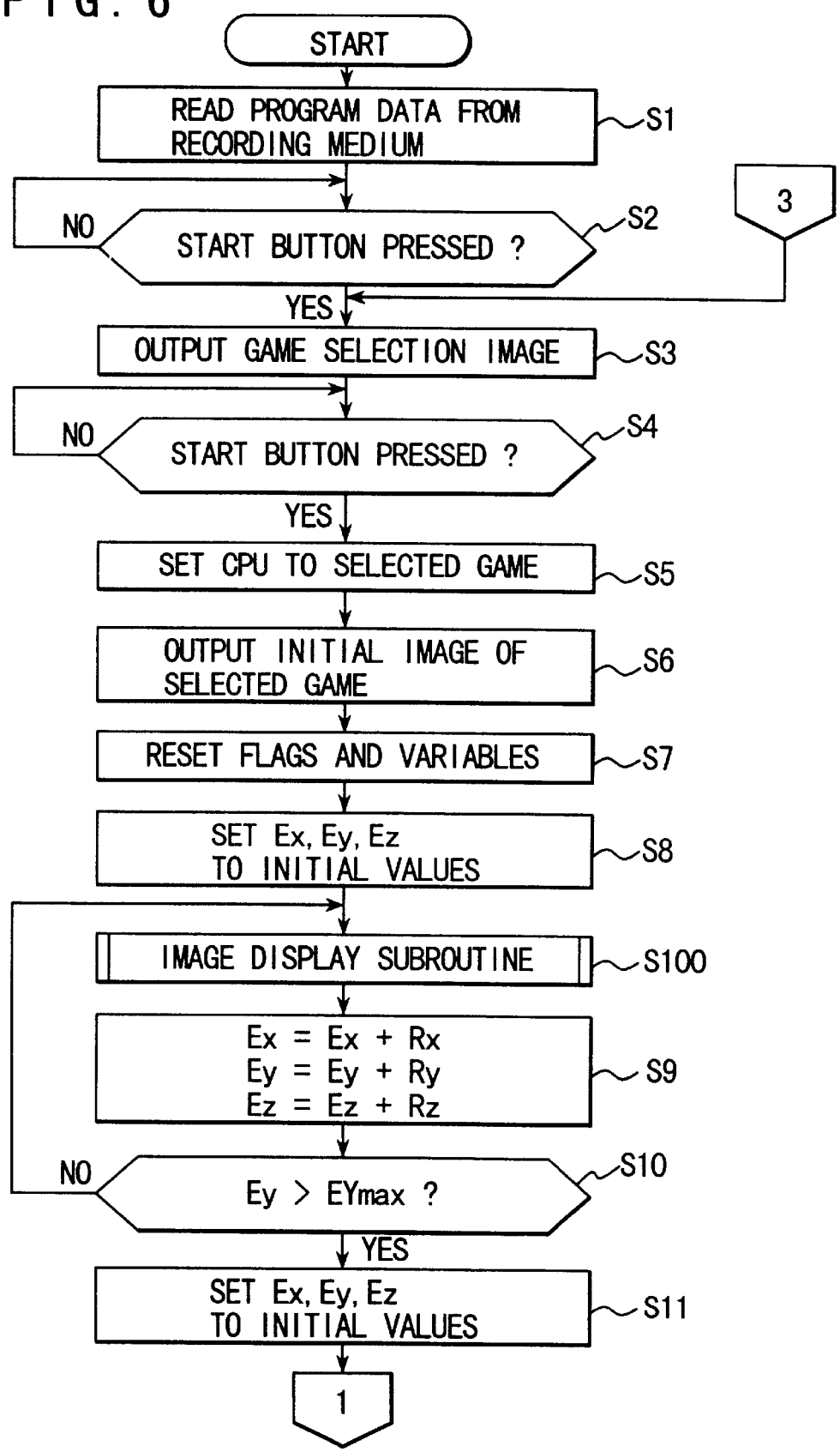
FIGS. 6 through 8 are flowcharts of a control sequence according to a main routine of a game program which controls the video game system shown in FIG. 1.
Figure 7:
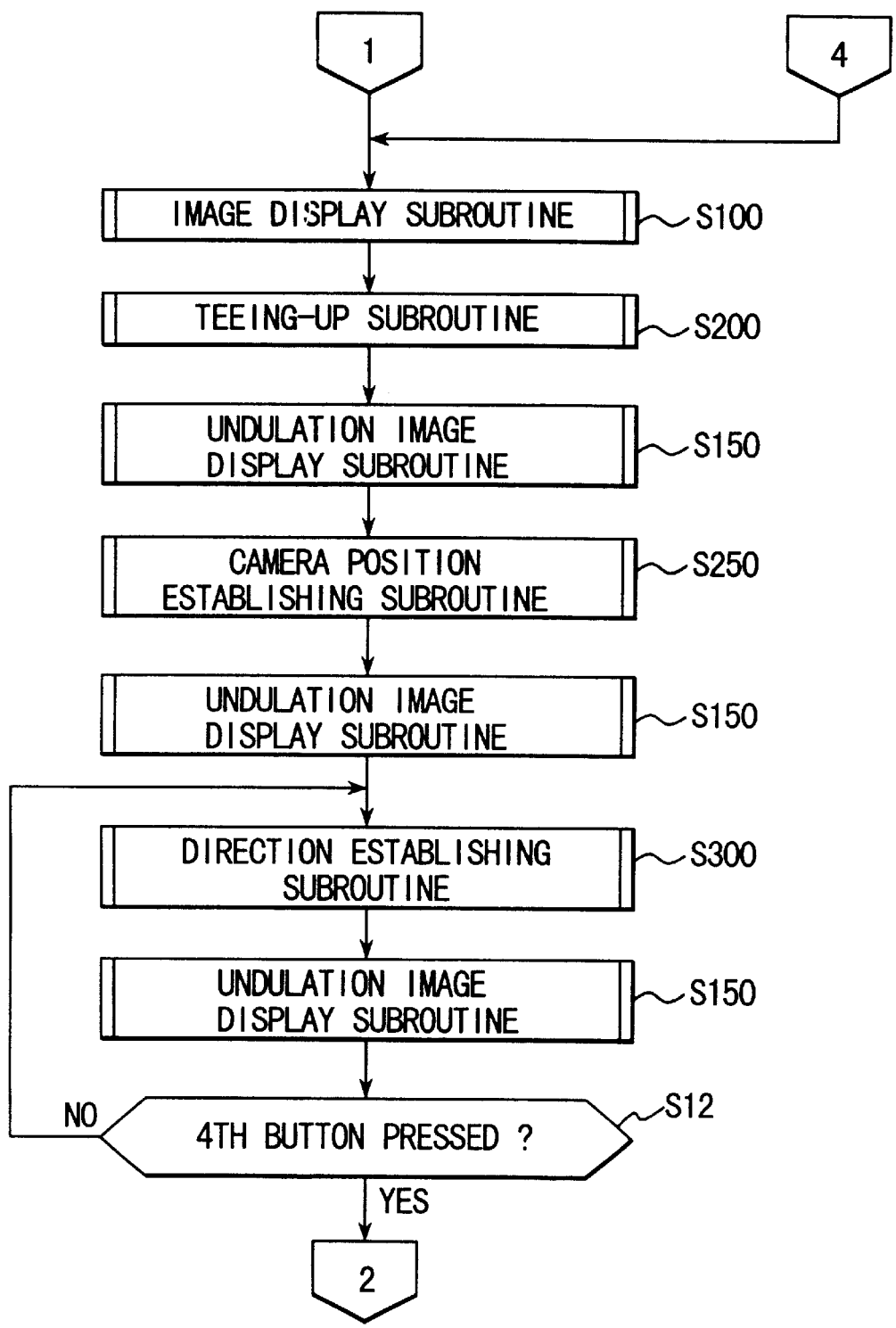
Figure 8:
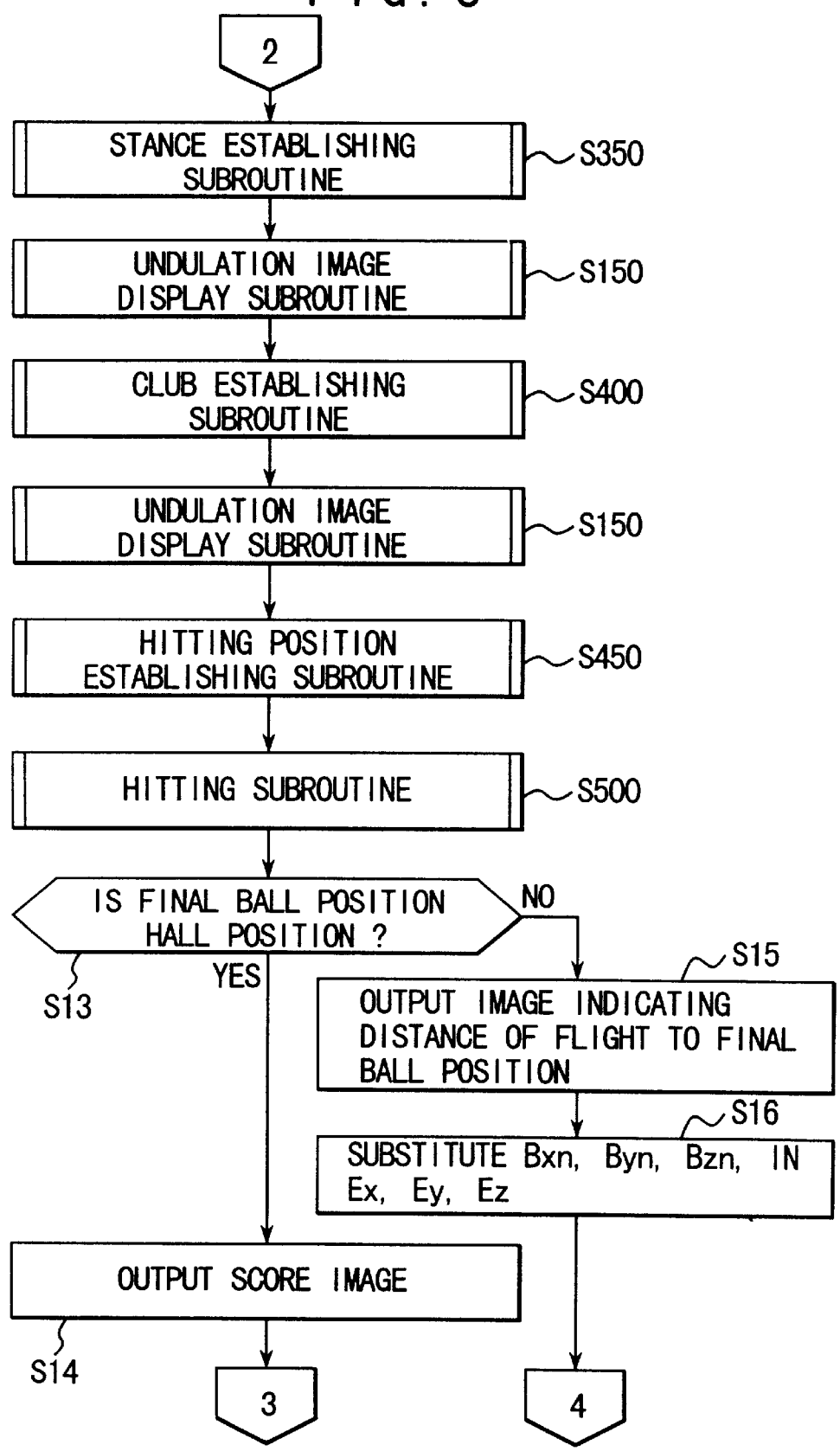

FIGS. 6 through 8 show flowcharts of a control sequence according to a main routine of a game program which controls the video game system shown in FIG. 1. The control sequence shown in FIG. 6 includes a step S1 which is executed by the operating system stored in the ROM 6 shown in FIG. 1, and other steps which are executed based on the game program data read from the recording medium 30. The steps based on the game program data are executed by the various functions or means of the CPU 1 as shown in FIG. 2.

As shown in FIG. 6, the operating system instructs the recording medium driver 19 to read graphic data, audio data, and game program data from the recording medium 30 in a step S1. Of the data read from the recording medium 30, the game program data are stored in the main memory 5, and imparts the functions or means shown in FIG. 2 to the CPU 1. The graphic data, i.e., texture data, are stored in the buffer 11 connected to the graphic processor 10, and are assigned respective texture data numbers. The audio data are stored in the buffer 14 connected to the audio processor 13, and are assigned respective audio data numbers. Usually, not all the graphic and audio data are stored in the buffers 11, 14 in the step S1. However, it is assumed for illustrative purposes that all the graphic and audio data are loaded from the recording medium 30 in the step S1.

In a step S2, the button operation detecting means 1a determines whether the start button 22a of the controller 22 has been pressed or not by the game player. If pressed (YES), then control proceeds to a step S3.

In the step S3, the graphic command issuing means 1g issues a graphic command for displaying a game selection image to the graphic processor 10. Based on the supplied graphic command, the graphic processor 10 stores graphic data of the game selection image in the display area of the buffer 11 and displays the game selection image on the display screen of the television monitor 12.

In a next step S4, the button operation detecting means 1a determines whether the start button 22a of the controller 22 has been pressed or not by the game player. If pressed (YES), then control proceeds to a step S5.

Before the start button 22a is pressed by the game player, the game player selects a desired video game, here a golf game, on the game selection image using the arrow keys. After the game player has selected a desired video game, the game player presses the start button 22a. The selection of some of the games on the game selection image, such as a martial arts game, includes choosing characters and other items for the game.

In the step S5, the CPU 1 is set to the selected game.

In a step S6, the graphic command issuing means 1g issues a graphic command for displaying an initial image of the selected game to the graphic processor 10. The graphic processor 10 stores graphic data of the initial image in the display area of the buffer 11 and displays the initial image on the display screen of the television monitor 12.

In a step S7, the variable setting means 1h resets flags and variables held in the main memory 5.

In a step S8, the viewpoint position data setting means 1b sets viewpoint position data Ex, Ey, Ez held in the main memory 5 to respective initial values. The viewpoint position data Ex, Ey, Ez represent a horizontal address, a vertical address, and a height, respectively. The initial values represent address data which are indicative of the position of the teeing ground Tg (see FIG. 3A) of a golf course.

In a step S100, the CPU 1 executes an image display subroutine. In the image display subroutine, a graphic image based on the viewpoint position data Ex, Ey, Ez set in the step S8 is displayed. The image display subroutine will be described in detail later on.

In a step S9, the calculating means 1d adds variables Rx, Ry, Rz (which are not constant) respectively to the viewpoint position data Ex, Ey, Ez.

In a step S10, the decision means 1f determines whether the viewpoint position data Ey have exceeded a maximum value EYmax or not. If the viewpoint position data Ey have exceeded a maximum value EYmax (YES), then control proceeds to a step S11. If not (NO), then control goes back to the step S10. The loop which comprises the steps S100, S9, S10 serves to display the golf course in order to guide the game player through the golf course by displaying a golf course image in the image display subroutine each time the values of the viewpoint position data Ex, Ey, Ez are varied.

In the step S11, the viewpoint position data setting means 1b sets the viewpoint position data Ex, Ey, Ez to the respective initial values.

In FIG. 7, the CPU 1 executes the image display subroutine in a step S100.

In a step S200, the CPU 1 executes a teeing-up subroutine for establishing a teeing-off position. The teeing-up subroutine will be described in detail later on.

In a step S150, the CPU 1 executes an undulation image display subroutine. An undulation image is an image of the guide Gu2 shown in FIG. 5. The undulation image is used as a guide to give the game player a better visual perception of distances within and heights of the golf course displayed in the golf game space. The guide Gu2 has its luminance set to higher values at its portions corresponding to higher areas of the golf course and its length displayed as shorter values at its portions corresponding to farther areas of the golf course. The undulation image display subroutine will be described in detail later on.

In a step S250, the CPU 1 executes a camera position establishing subroutine. In the camera position establishing subroutine, a camera position represents a position where the golf course and the golfer are imaged. The camera position establishing subroutine will be described in detail later on.

In a step S300, the CPU 1 executes a direction establishing subroutine. In the direction establishing subroutine, a direction represents the orientation of the body of the golfer.

In a step S12, the button operation detecting means 1a determines whether the fourth button 22f of the controller 22 has been pressed or not by the game player. If pressed (YES), then control proceeds to a step S350 (see FIG. 8). The step S12 serves to determine whether a process of establishing a direction in the direction establishing subroutine is to be finished or not. Unless the game player presses the fourth button 22f, control goes to the direction establishing subroutine in the step S300, and thereafter an undulation image is displayed in the following step S150 based on a direction setting Di established in the direction establishing subroutine.

In the step S350, the CPU 1 executes a stance establishing subroutine. In the stance establishing subroutine, a stance represents placement of the feet of the golfer. The stance establishing subroutine will be described in detail later on.

In a step S400, the CPU 1 executes a club establishing subroutine. In the club establishing subroutine, a club indicates a golf club such as an iron, a wood, etc. The club establishing subroutine will be described in detail later on.

In a step S450, the CPU 1 executes a hitting position establishing subroutine. In the hitting position establishing subroutine, a hitting position represents a position where the golf club head hits the golf ball. The hitting position establishing subroutine will be described in detail later on.

In a step S500, the CPU 1 executes a hitting subroutine. In the hitting subroutine, the CPU 1 mainly processes the data of a graphic image of the ball which has been hit and a background image. The hitting subroutine will be described in detail later on.

In a step S13, the decision means 1f determines whether a final ball position is the same as the position of the hole. If a final ball position is the same as the position of the hole (YES), then control goes to a step S14. If a final ball position is the same as the position of the hole (NO), then control goes to a step S15. This decision is made because different processes need to be effected when the ball is in the cup and when the ball is not in the cup.

In the step S14, the graphic command issuing means 1g issues a graphic command for displaying a score image to the graphic processor 10. Then, the result information setting means 1e supplies character data indicative of the number of strokes, etc. to the graphic processor 10. The graphic processor 10 then stores the data of a score image representing result information in the display area of the buffer 11, and displays the score image on the display screen of the television monitor 12. Thereafter, control goes back to the step S3.

In the step S15, the result information setting means 1e supplies character data indicative of the distance that the ball has flied to the final ball position to the graphic processor 10. The graphic processor 10 stores data of a graphic image representing the distance that the ball has flied to the final ball position in the display area of the buffer 11, and displays the graphic image on the display screen of the television monitor 12.

In a step S16, the viewpoint position data setting means 1b substitutes final ball position data Bxn, Byn, Byz in the respective viewpoint position data Ex, Ey, Ez. Thereafter, control goes back to the image display subroutine shown in FIG. 7. In the image display subroutine, the television monitor 12 displays an image in which the final ball position is used as a viewpoint position.

Figure 9:
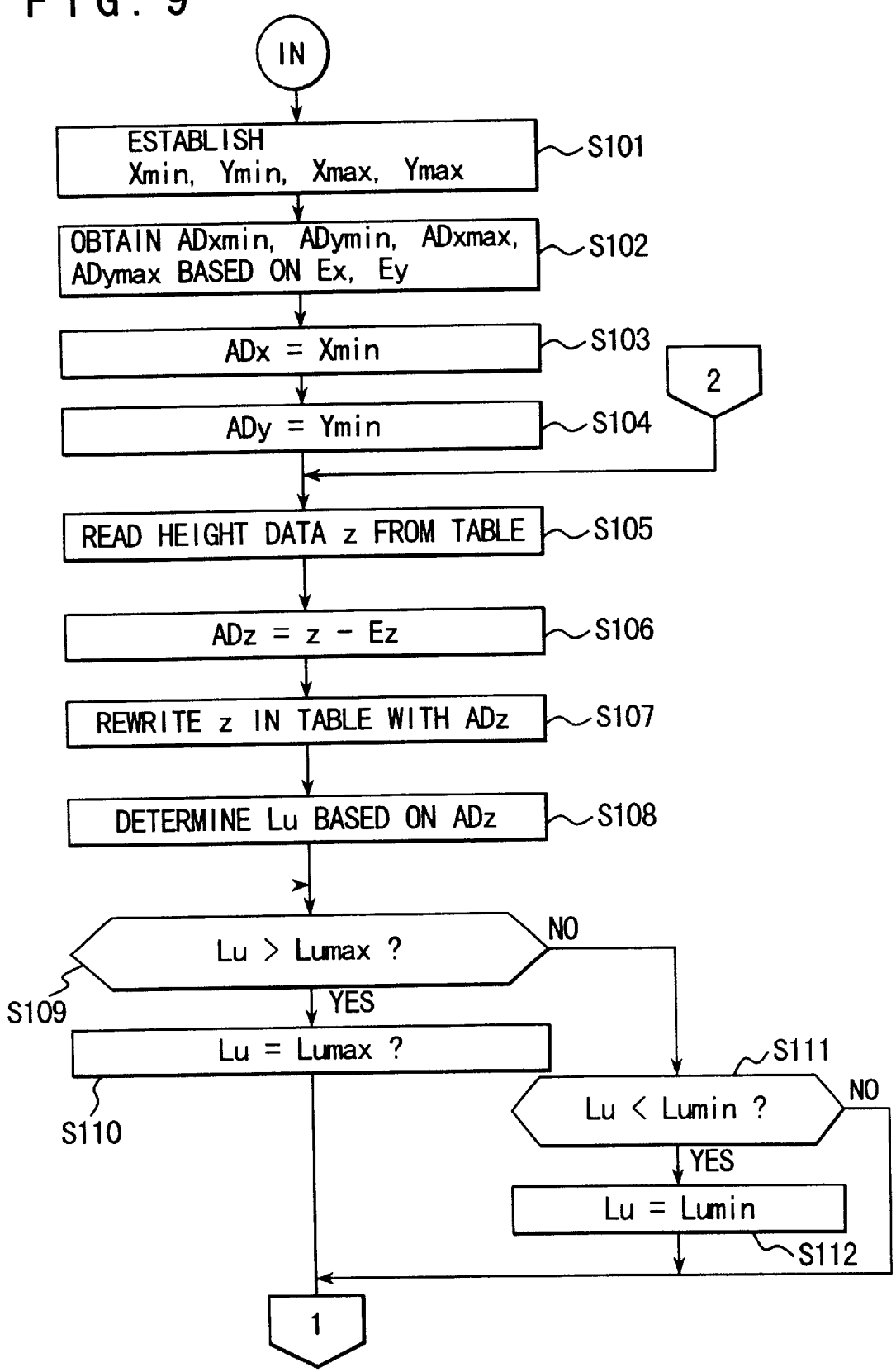
FIGS. 9 and 10 are flowcharts of a control sequence according to an image display subroutine included in the main routine.
Figure 10:
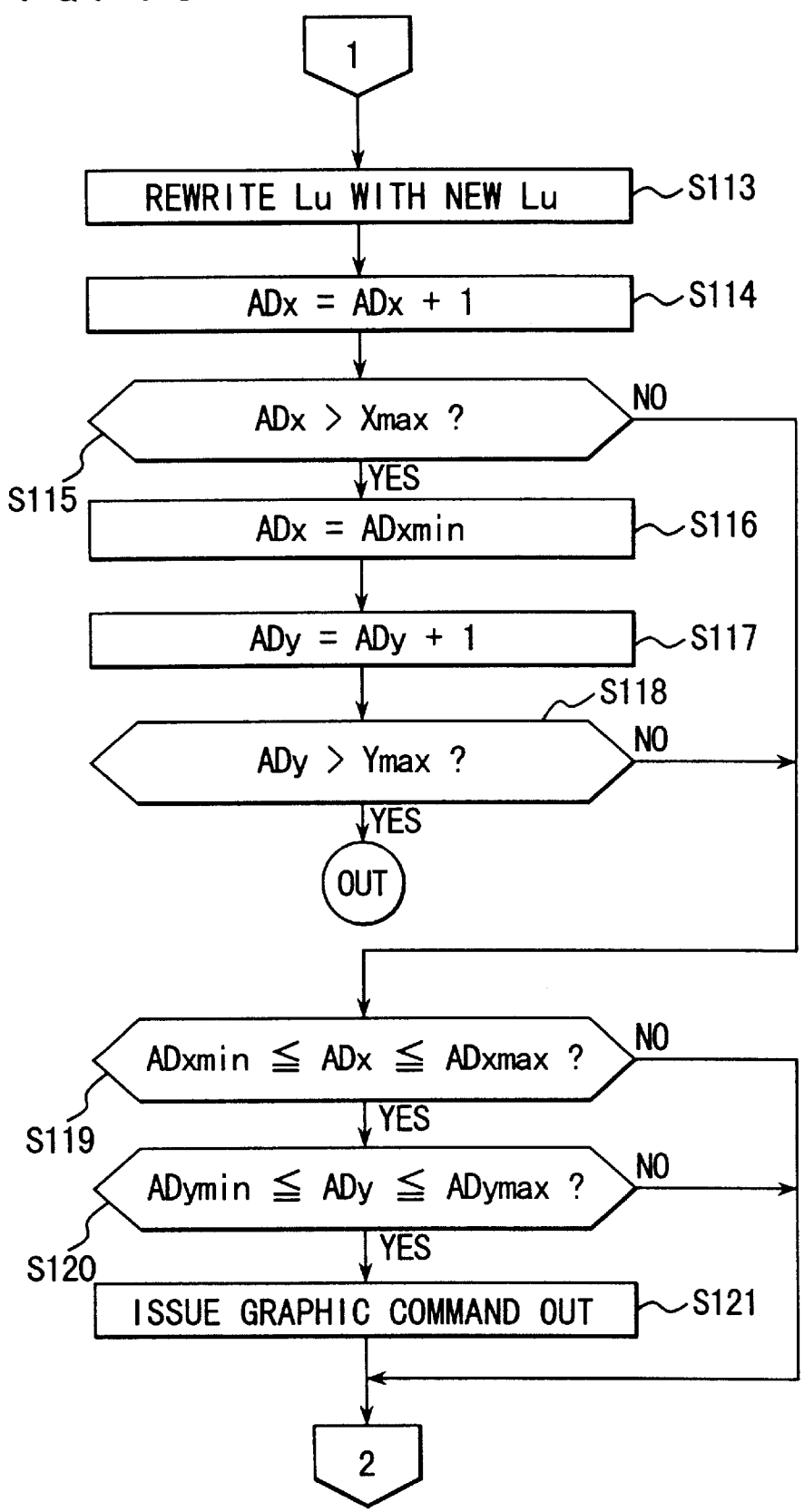

FIGS. 9 and 10 are flowcharts of a control sequence according to the image display subroutine in the steps S100 shown in FIGS. 6 and 7.

As shown in FIG. 9, in a step S101, the address setting means 1i establishes a horizontal minimum address Xmin, a vertical minimum Ymin, a horizontal maximum address Xmax, and a vertical maximum Ymax for the golf course. In the golf course shown in FIG. 3A, the minimum addresses are (0, 0) and the maximum addresses are (200, 530). The letters "x", "X" represent horizontal addresses, the letters "y", "Y" vertical addresses, and the letters "z", "Z" heights.

In a step S102, the address acquiring means 1j obtains horizontal minimum address data ADxmin, vertical minimum address data ADymin, horizontal maximum address data ADxmax, and vertical maximum address data ADymax in a display range from the table shown in FIG. 4B based on the viewpoint position data Ex, Ey, Ez. The display range is the extracted area Ar1 as shown in FIG. 4A.

In a step S103, the variable setting means 1h substitutes the horizontal minimum address Xmin in address data ADx.

In a step S104, the variable setting means 1h substitutes the vertical minimum address Ymin in address data ADy.

In a step S105, the height data correcting means 1k reads height data z from the table shown in FIG. 4B.

In a step S106, the calculating means 1d subtracts the height data Ez of the viewpoint position data from the height data z read in the step S105 under the control of the height data correcting means 1k, thereby producing height data ADz. Specifically, the height data z registered in the table are of an initial value, and the height data Ez represents the height of the position where the golf ball is placed. The height data z registered in the table need to be corrected from time to time based on the height of the position where the golf ball is placed. In the step S106, therefore, the calculating means 1d subtracts the height data Ez of the viewpoint position data from the height data z read from the table, for thereby producing the height data ADz.

Before the golf ball is hit for the first time, the viewpoint position data Ex, Ey, Ez are used. After the golf ball has been hit for the first time, ball position data Bx, By, Bz are substituted in the respective viewpoint position data Ex, Ey, Ez. Therefore, before the golf ball is hit for the first time, the height data Ez of the viewpoint position data are subtracted from the height data z read from the table. After golf ball has been hit for the first time, the ball position data Bz are subtracted from the height data z read from the table.

In a step S107, the height data correcting means $1k$ writes the height data ADz determined in the step S106 in the location in the table from which the height data z have been read. Therefore, the height data z read from the table are corrected into the height data represented by the viewpoint position data Ez.

In a step S108, the luminance processing means $1q$ determines luminance data Lu based on the height data ADz.

In a step S109, the decision means $1f$ determines whether the luminance data Lu are greater than a maximum luminance value Lumax or not. If the luminance data Lu are greater than the maximum luminance value Lumax (YES), then control proceeds to a step S110. If not (NO), then control proceeds to a step S111.

In the step S110, the luminance processing means $1q$ substitutes the maximum luminance value Lumax in the luminance data Lu.

In the step S111, the decision means $1f$ determines whether the luminance data Lu are smaller than a minimum luminance value Lumin or not. If the luminance data Lu are smaller than the minimum luminance value Lumin (YES), then control proceeds to a step S112. If not (NO), then control proceeds to a step S113 (see FIG. 10).

In the step S112, the luminance processing means $1q$ substitutes the minimum luminance value Lumin in the luminance data Lu.

In the step S113, the luminance processing means $1q$ rewrites the corresponding luminance data Lu in the table with the newly determined luminance data Lu.

In a next step S114, the calculating means $1d$ adds "1" to the address data ADx.

In a step S115, the decision means $1f$ determines whether the address data ADx are larger than the horizontal maximum address Xmax or not. If the address data ADx are larger than the horizontal maximum address Xmax (YES), then control proceeds to a step S116. If not (NO), then control jumps to a step S119.

In the step S116, the variable setting means $1h$ substitutes the horizontal minimum address data ADxmin within the display range in the address data ADx.

In a step S117, the calculating means $1d$ adds "1" to the address data ADy.

In s step S118, the decision means $1f$ determines whether the address data ADy are larger than the vertical maximum address Ymax or not. If the address data ADy are larger than the vertical maximum address Ymax (YES), then control finishes the image display subroutines. If not (NO), then control goes to the step S119.

In the step S119, the decision means $1f$ determines whether or not the address data ADx is equal to or greater than the horizontal minimum address data ADxmin in the display range and also equal to or smaller than the horizontal maximum address data ADxmax in the display range. If the address data ADx is equal to or greater than the horizontal minimum address data ADxmin in the display range and also equal to or smaller than the horizontal maximum address data ADxmax in the display range (YES), then control proceeds to a step S120. If not (NO), then control goes back to the step S105.

In the step S120, the decision means $1f$ determines whether or not the address data ADy is equal to or greater than the vertical minimum address data ADymin in the display range and also equal to or smaller than the vertical maximum address data ADymax in the display range. If the address data ADy is equal to or greater than the vertical minimum address data ADymin in the display range and also equal to or smaller than the vertical maximum address data ADymax in the display range (YES), then control proceeds to a step S121. If not (NO), then control goes back to the step S105.

In the step S121, the graphic command issuing means $1g$ issues a graphic command to the graphic processor 10. In response to the graphic command, the graphic processor 10 stores graphic data of an image based on the viewpoint position data Ex, Ey, Ez in the display area of the buffer 11, and displays the image on the display screen of the television monitor 12.

Figure 11:
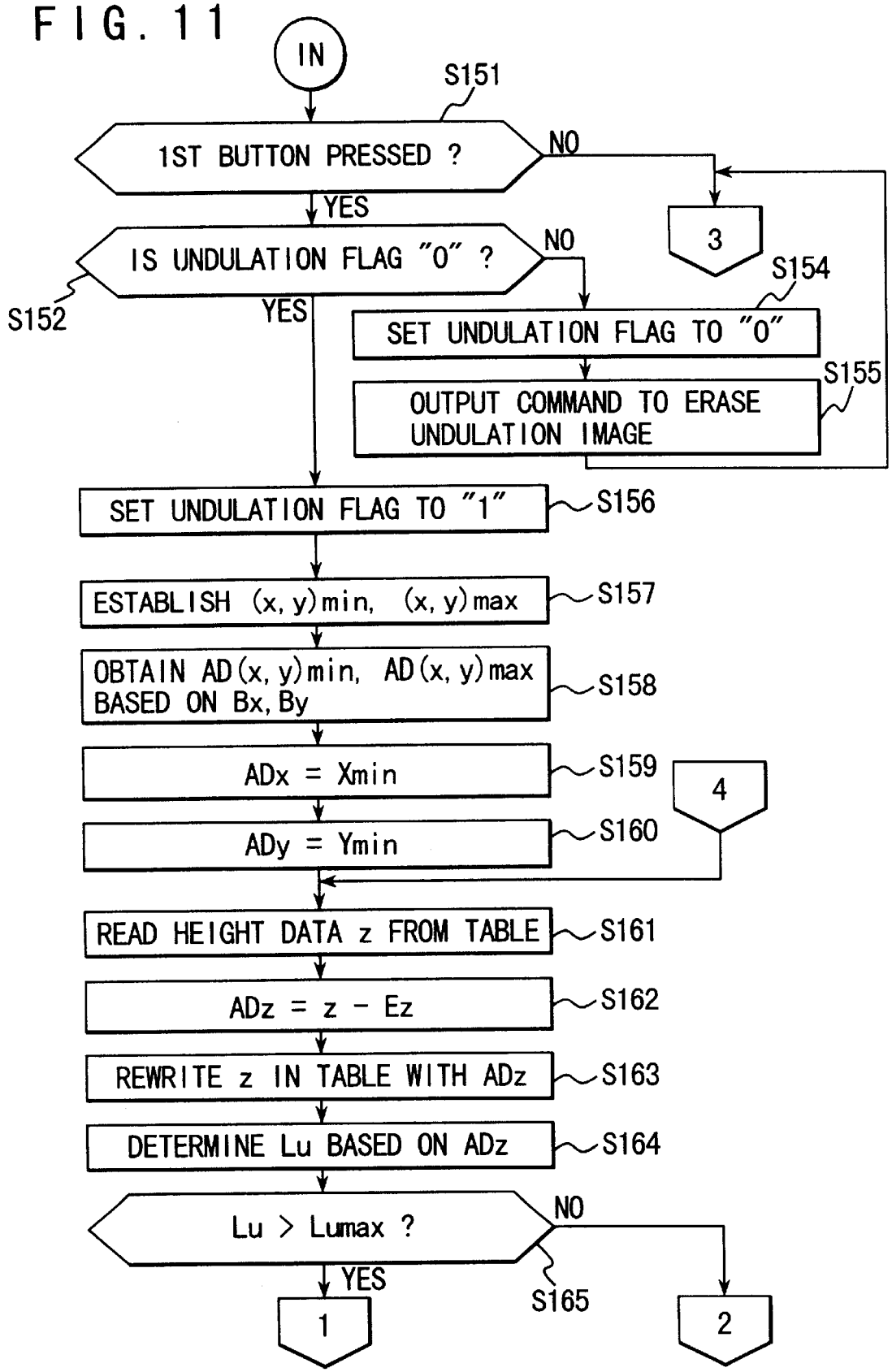
FIGS. 11 and 12 are flowcharts of a control sequence according to an undulation image display subroutine included in the main routine.
Figure 12:
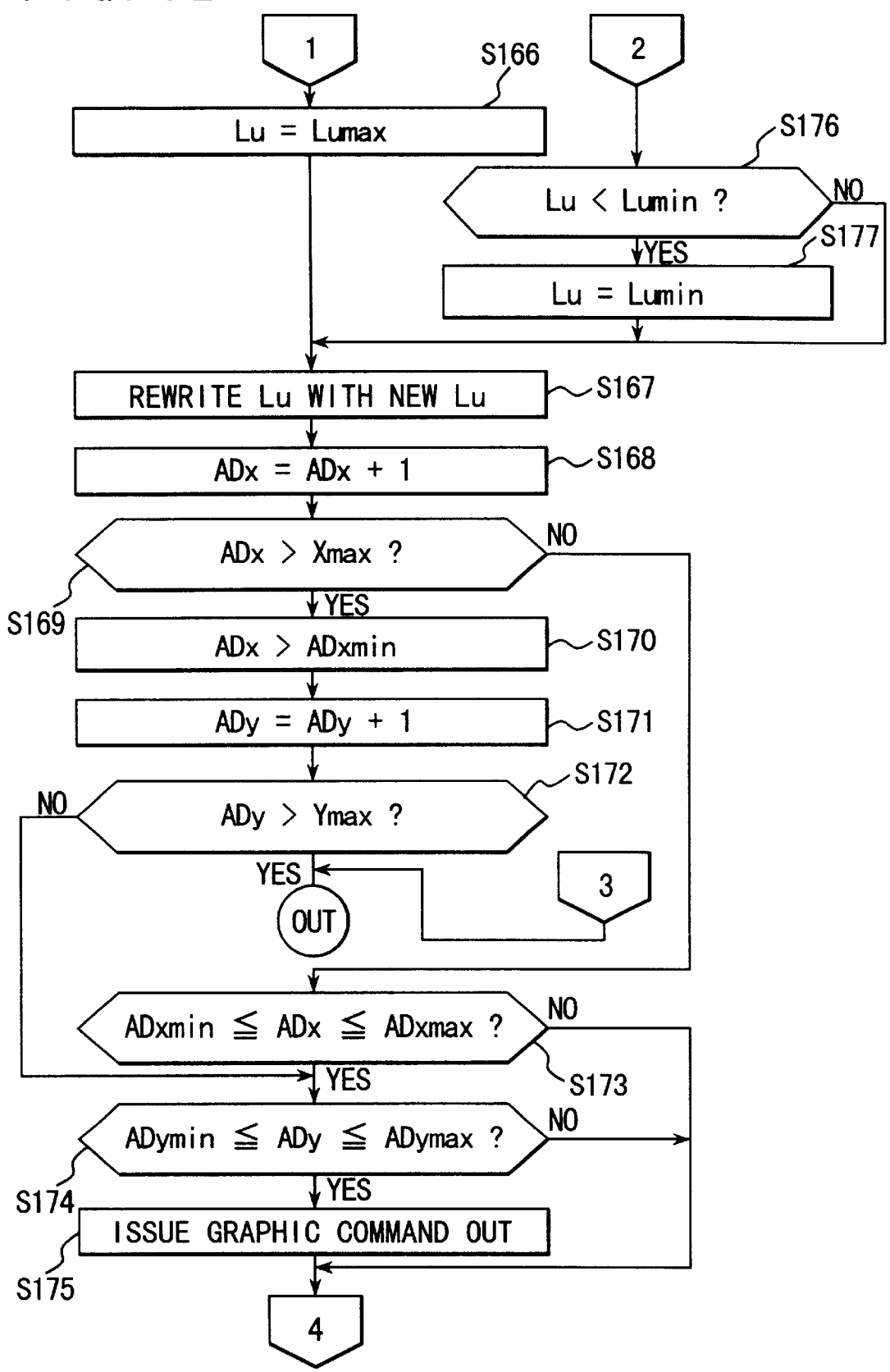

FIGS. 11 and 12 are flowcharts of a control sequence according to the undulation image display subroutine in the steps S150 shown in FIGS. 7 and 8. As described above, the undulation image serves as a guide which allows the game player to visually recognize intuitively distances within and heights of the golf course displayed on the display screen of the television monitor 12, and to make appropriate control actions through the controller 22 based on the visual recognition.

As shown in FIG. 11, the button operation detecting means $1a$ determines whether the first button $22c$ of the controller 22 has been pressed or not by the game player. If the first button $22c$ has been pressed (YES), then control proceeds to a step S152. If not (NO), then control puts an end to the undulation image display subroutine.

In the step S152, the undulation output decision means $1m$ determines whether an undulation flag is "0" or not. If the undulation flag is "0" (YES), then control proceeds to a step S156. If the undulation flag is not "0" (NO), then control goes to a step S154. The undulation flag is a flag indicating whether the guide Gu2 shown in FIG. 5 is displayed or not. For example, when the guide Gu2 is displayed, the undulation flag is "1", and when the guide Gu2 is not displayed, the undulation flag is "0". If the undulation flag is "0" in the step S152, then control goes to the step 156 and following steps to output an undulation image. If undulation flag is "1" in the step S152, then the undulation image is erased in steps S154, S155.

In the step S154, the undulation output decision means $1m$ sets the undulation flag to "0".

In the step S155, the undulation image displaying means $1n$ issues a command for erasing the undulation image to the graphic processor 10. In response to the supplied command, the graphic processor 10 stops writing line data into the buffer 11. The undulation image, i.e., the image of the guide Gu2 shown in FIG. 5, is now erased from the display screen of the television monitor 12. The undulation image may be erased by writing another image over the undulation image.

In the step S156, the undulation output decision means $1m$ sets the undulation flag to "1".

In a step S157, the address setting means $1i$ establishes a horizontal minimum address Xmin, a vertical minimum Ymin, a horizontal maximum address Xmax, and a vertical maximum Ymax for the golf course.

In a step S158, the address acquiring means $1j$ obtains horizontal minimum address data ADxmin, vertical minimum address data ADymin, horizontal maximum address data ADxmax, and vertical maximum address data ADymax in a display range of the undulation image based on the ball position data Bx, By.

In a step S159, the variable setting means 1h substitutes the horizontal minimum address Xmin in the address data ADx.

In a step S160, the variable setting means 1h substitutes the vertical minimum address Ymin in the address data ADy.

In a step S161, the height data correcting means 1k reads height data z indicated by the address data ADx, ADy from the table shown in FIG. 4B.

In a step S162, the calculating means 1d subtracts the height data Ez of the viewpoint position data from the height data z read in the step S161 under the control of the height data correcting means 1k, thereby producing height data ADz. Specifically, the height data z registered in the table are of an initial value, and the height data Ez represents the height of the position where the golf ball is placed. The height data z registered in the table need to be corrected from time to time based on the height of the position where the golf ball is placed. In the step S162, therefore, the calculating means 1d subtracts the height data Ez of the viewpoint position data from the height data z read from the table, for thereby producing the height data ADz.

In a step S163, the height data correcting means 1k writes the height data ADz determined in the step S162 in the location in the table from which the height data z have been read. Therefore, the height data z read from the table are corrected into the height data represented by the viewpoint position data Ez.

In a step S164, the luminance processing means 1q determines luminance data Lu based on the height data ADz.

In a step S165, the decision means 1f determines whether the luminance data Lu are greater than a maximum luminance value Lumax or not. If the luminance data Lu are greater than the maximum luminance value Lumax (YES), then control proceeds to a step S166 (see FIG. 12). If not (NO), then control proceeds to a step S176.

In the step S166, the luminance processing means 1q substitutes the maximum luminance value Lumax in the luminance data Lu.

In a next step S167, the luminance processing means 1q rewrites the corresponding luminance data Lu in the table with the newly determined luminance data Lu.

In a next step S168, the calculating means 1d adds "1" to the address data ADx.

In a step S169, the decision means 1f determines whether the address data ADx are greater than the horizontal maximum address Xmax or not. If the address data ADx are larger than the horizontal maximum address Xmax (YES), then control proceeds to a step S170. If not (NO), then control jumps to a step S173.

In the step S170, the variable setting means 1h substitutes the horizontal minimum address data ADxmin within the display range in the address data ADx.

In a step S171, the calculating means 1d adds "1" to the address data ADy.

In s step S172, the decision means 1f determines whether the address data ADy are greater than the vertical maximum address Ymax or not. If the address data ADy are larger than the vertical maximum address Ymax (YES), then control finishes the image display subroutines. If not (NO), then control goes to a step S174.

In the step S173, the decision means 1f determines whether or not the address data ADx is equal to or greater than the horizontal minimum address data ADxmin in the display range and also equal to or smaller than the horizontal maximum address data ADxmax in the display range. If the address data ADx is equal to or greater than the horizontal minimum address data ADxmin in the display range and also equal to or smaller than the horizontal maximum address data ADxmax in the display range (YES), then control proceeds to the step S174. If not (NO), then control goes back to the step S161.

In the step S174, the decision means 1f determines whether or not the address data ADy is equal to or greater than the vertical minimum address data ADymin in the display range and also equal to or smaller than the vertical maximum address data ADymax in the display range. If the address data ADy is equal to or greater than the vertical minimum address data ADymin in the display range and also equal to or smaller than the vertical maximum address data ADymax in the display range (YES), then control proceeds to a step S175. If not (NO), then control goes back to the step S161.

Figure 3B:
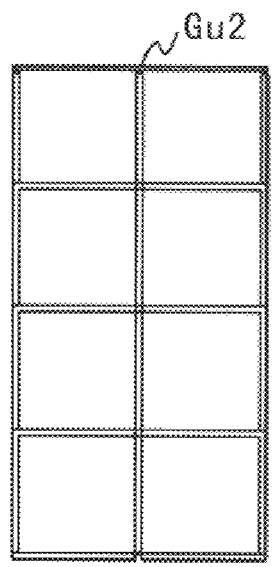

In the step S175, the graphic command issuing means 1g issues a graphic command for displaying a line to the graphic processor 10. In response to the graphic command, the graphic processor 10 stores data of lines in the display area of the buffer 11, and displays the lines as the guide Gu2 on the display screen of the television monitor 12. The guide Gu2 is represented by a matrix of image data as shown in FIG. 3B. The image of the golf course is displayed three-dimensionally depending on the viewpoint position, and the guide Gu2 is also displayed three-dimensionally. Specifically, the guide Gu2 is displayed as a number of lines interconnecting vertices of polygons of the golf course in the display range of the guide Gu2. The luminance of the guide Gu2 is determined based on the height of the vertices of polygons. Each of the lines is displayed as interconnecting a starting point aligned with a polygon vertex and an ending point which is also aligned with another polygon vertex. The luminance of each of the lines has graduations depending on the luminance of the starting point and the luminance of the ending point. As described above, if the luminance of the starting point of a line to is higher than the luminance of the ending point of the line, then the luminance of the line is highest at the starting point and is progressively lower toward the ending point. Conversely, if the luminance of the starting point of a line is lower than the luminance of the ending point of the line, then the luminance of the line is lowest at the starting point and is progressively higher toward the ending point.

In the step S176, the decision means 1f determines whether the luminance data Lu are smaller than a minimum luminance value Lumin or not. If the luminance data Lu are smaller than the minimum luminance value Lumin (YES), then control proceeds to a step S177. If not (NO), then control jumps to the step S167.

In the step S177, the luminance processing means 1q substitutes the minimum luminance value Lumin in the luminance data Lu.

In the steps S161–S163, the height data are corrected. Thereafter, insofar as the address data ADx, ADy fall within the range defined by the address data ADxmin, ADymin, ADxmax, ADymax within the display range of the undulation image, lines are repeatedly displayed to display the image of the guide Gu2 on the display screen of the television monitor 12.

The display of the undulation image or the guide Gu2 offers various advantages as described below.

For the game player to cause the golfer in the golf game space to hit the golf ball, the game player needs to operate the controller 22 in a certain manner which will be described later on. The distance that the golf ball traverses in the golf game space varies depending on how the game player operates the controller 22. As shown in FIG. 5A, the golf course in the golf game space is set to certain distances and terrain profile or topographical features within the golf game space. For example, the golf course shown in FIG. 5A has a length of 518 yards, and includes bunkers and surface irregularities. The game player operates the controller 22 based on the information representing those distances and terrain profile features.

For the golfer to hit the golf ball to a relatively near location, as when rolling the golf ball, it is necessary to display distances and terrain features in a manner to be easily visually and intuitively perceived. Distances and terrain features thus displayed permit the game player to operate the controller 22 depending thereon. Such displayed distances and terrain features are expressed as colors and shades of the displayed image of the golf course. The colors and shades of the displayed image of the golf course are represented by color and luminance information determined by the graphic data generating processor 3 shown in FIG. 1.

However, it is quite difficult for the game player to easily perceive distances and terrain features of the golf course only with the colors and shades of the displayed image of the golf course because the golf course, which is actually very large in size, is displayed in a very small range on the display screen of the television monitor 12. Stated otherwise, it is highly difficult to enable the game player, who is aware of actual sizes, distances, and terrain features of golf courses, to visually recognize the size, distances, and terrain features of the golf course displayed in the golf game space only with colors and luminance gradations.

According to the present invention, as shown in FIG. 5, the guide Gu2 is displayed in overlapping relation to the golf course displayed in the golf game space. As described above, the guide Gu2 is displayed according to graphic commands for displaying lines. As shown in FIG. 3B, the guide Gu2 comprises a matrix of lines. When the guide Gu2 is displayed over the displayed golf course, the lengths of the lines of the guide Gu2 differ depending on the distance from the viewpoint position and the position on the golf course. The luminance of the guide G2 varies based on the luminance data Lu thereof. Consequently, the guide Gu2 gives the game player an intuitive perception of the size, distances, and terrain features of the golf course displayed in the golf game space, and allows the game player to operate the controller 22 accurately depending on the displayed golf course.

Figure 13:
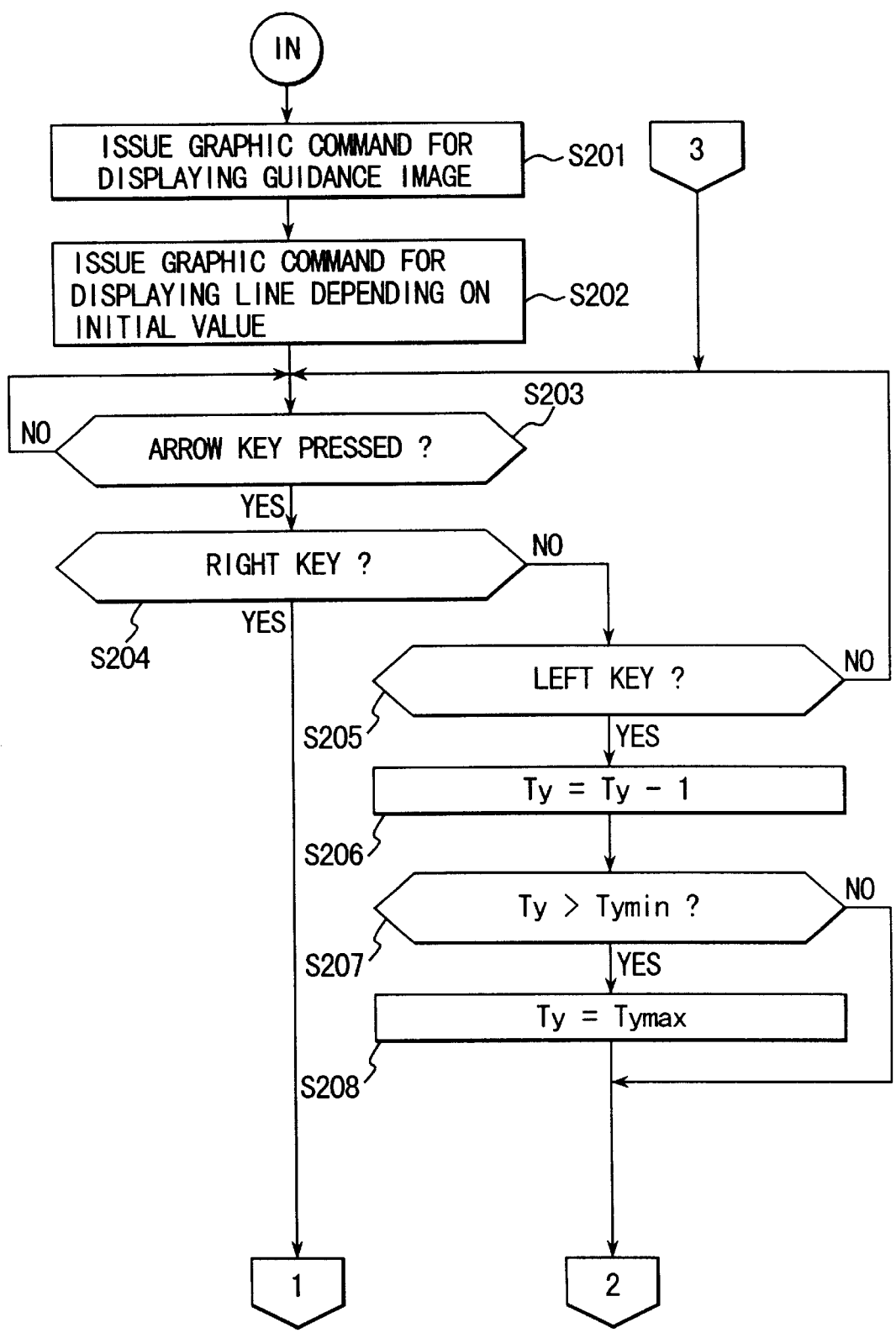
FIG. 13 and 14 are flowcharts of a control sequence according to a teeing-up subroutine included in the main routine.
Figure 14:
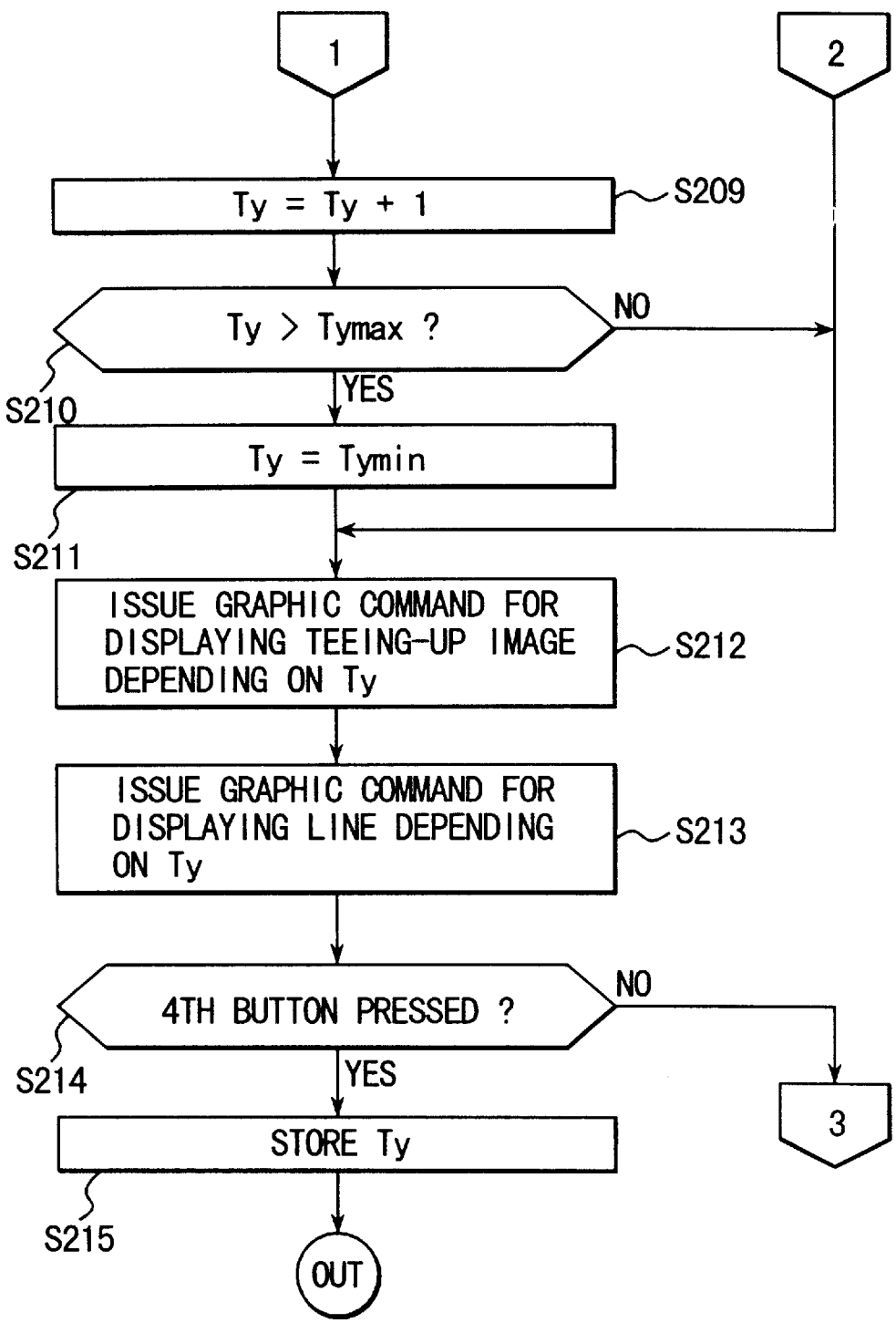

FIGS. 13 and 14 are flowcharts of a control sequence according to the teeing-up subroutine S200 shown in FIG. 7. The teeing-up subroutine establishes a teeing-off position.

As shown in FIG. 13, the graphic command issuing means 1g issues a graphic command for displaying a guidance image to the graphic processor 10 in a step S201. In response to the supplied graphic command, the graphic processor 10 stores the data of a guidance image in the display area of the buffer 11, and displays the guidance image for establishing a teeing-off position in the display area Ar3 on the display screen of the television monitor 12 and also displays the guide Gu1 (see FIG. 5) in the right display area on the display screen of the television monitor 12.

In a step S202, the graphic command issuing means 1g issues a graphic command for displaying a line depending on an initial value to the graphic processor 10. In response to the supplied graphic command, the graphic processor 10 stores the data of a line extending from a starting point address to an ending point address in the buffer 11. This line represents the indicator image In in the guide Gu1 shown in FIG. 5. The guide Gu1 represents a reduced image of the golf course which is presently selected. With the indicator image In displayed in the guide Gu1, the game player can now predict a trajectory which will be followed by the golf ball, a distance which will be traversed by the golf ball, and a position at which the golf ball will arrive, if the game player operates the controller 22 to cause the golfer Ma in the golf game space to tee off the golf ball with present settings.

In a step S203, the button operation detecting means 1a determines whether an arrow key has been pressed or not by the game player. If an arrow key has been pressed (YES), then control proceeds to a step S204.

In the step S204, the button operation detecting means 1a determines whether the pressed arrow key is the right key R or not. If the pressed arrow key is the right key R (YES), then control proceeds to a step S209 (see FIG. 14). If not (NO), then control goes to a step S205.

In the step S205, the button operation detecting means 1a determines whether the pressed arrow key is the left key L or not. If the pressed arrow key is the left key L (YES), then control proceeds to a step S206. If not (NO), then control goes back to the step S203.

In the step S206, the calculating means 1d subtracts "1" from a teeing-up setting Ty.

In a next step S207, the decision means 1f determines whether the teeing-up setting Ty is greater than a teeing-up setting minimum value Tymin or not. If the teeing-up setting Ty is greater than the teeing-up setting minimum value Tymin (YES), then control proceeds to a step S208. If not (NO), then control jumps to a step S212 (see FIG. 14).

In the step S208, the variable setting means 1h substitutes a teeing-up setting maximum value Tymax in the teeing-up setting Ty.

In the step S209, the calculating means 1d adds "1" to the teeing-up setting Ty.

In a next step S210, the decision means 1f determines whether the teeing-up setting Ty is greater than the teeing-up setting maximum value Tymax or not. If the teeing-up setting Ty is greater than the teeing-up setting maximum value Tymax (YES), then control proceeds to a step S211. If not (NO), then control jumps to the step S212.

In the step S211, the variable setting means 1h substitutes the teeing-up setting minimum value Tymin in the teeing-up setting Ty.

In the step S212, the graphic command issuing means 1g issues a graphic command for displaying a teeing-up image depending on the teeing-up setting Ty to the graphic controller 10. The display area Ar3 shown in FIG. 5 now displays a teeing-up image depending on the teeing-up setting Ty.

In a next step S213, the graphic command issuing means 1g issues a graphic command for displaying a line to the graphic controller 10. In response to the supplied command, the graphic controller 10 stores the data of a line extending from a starting point address to an ending point address in the buffer 11. Therefore, the line In in the guide Gu1 displayed on the display screen of the television monitor 12 is also displayed depending on the teeing-up setting Ty.

In a step S214, the button operation detecting means 1a determines whether the fourth button 22f has been pressed or not by the game player. If pressed (YES), then control proceeds to a step S215. If not (NO), then control goes back to the step S203.

In the step S215, the parameter managing means 1o stores the teeing-up setting Ty in the main memory 5.

Figure 15:
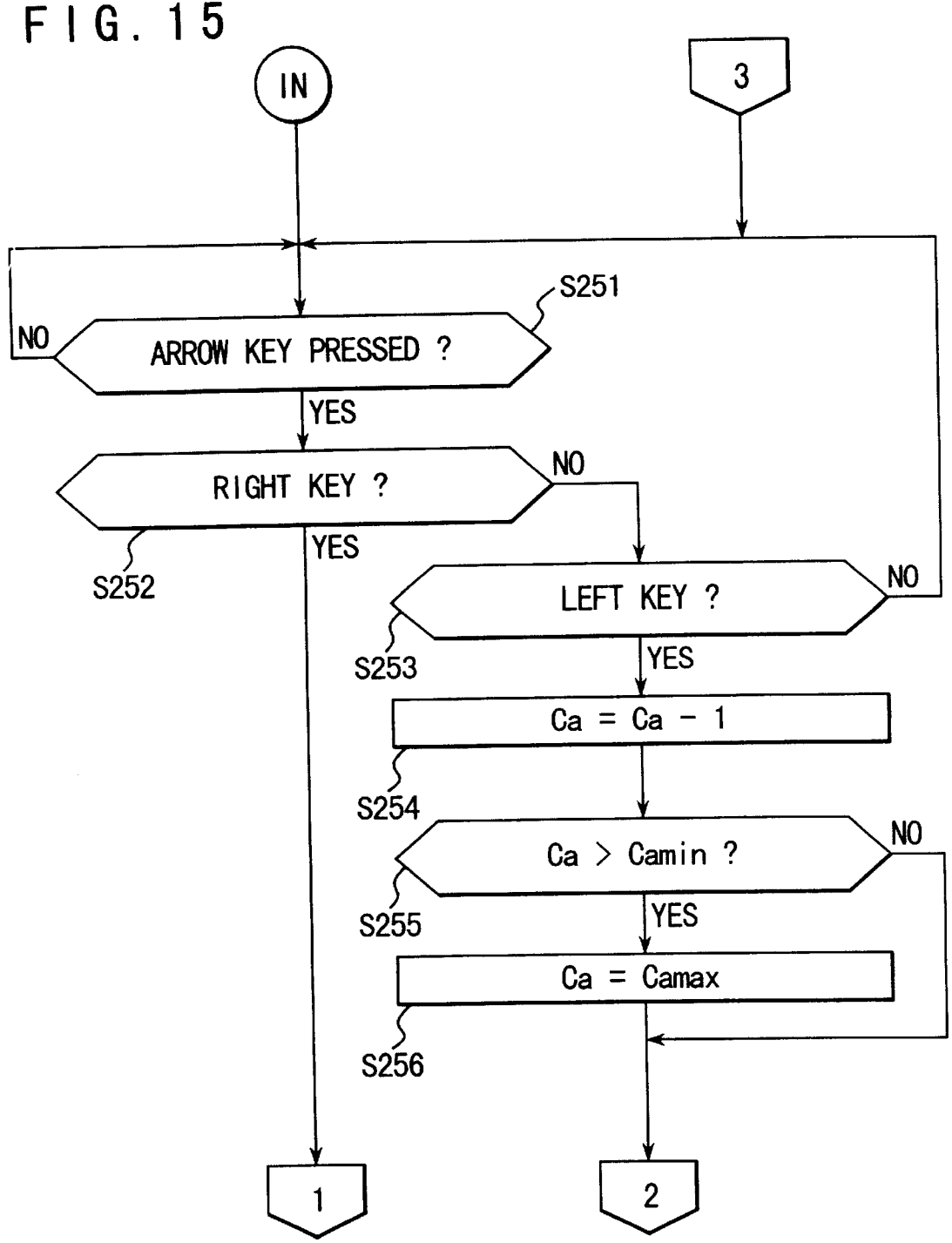
FIGS. 15 and 16 are flowcharts of a control sequence according to a camera position establishing subroutine included in the main routine.
Figure 16:
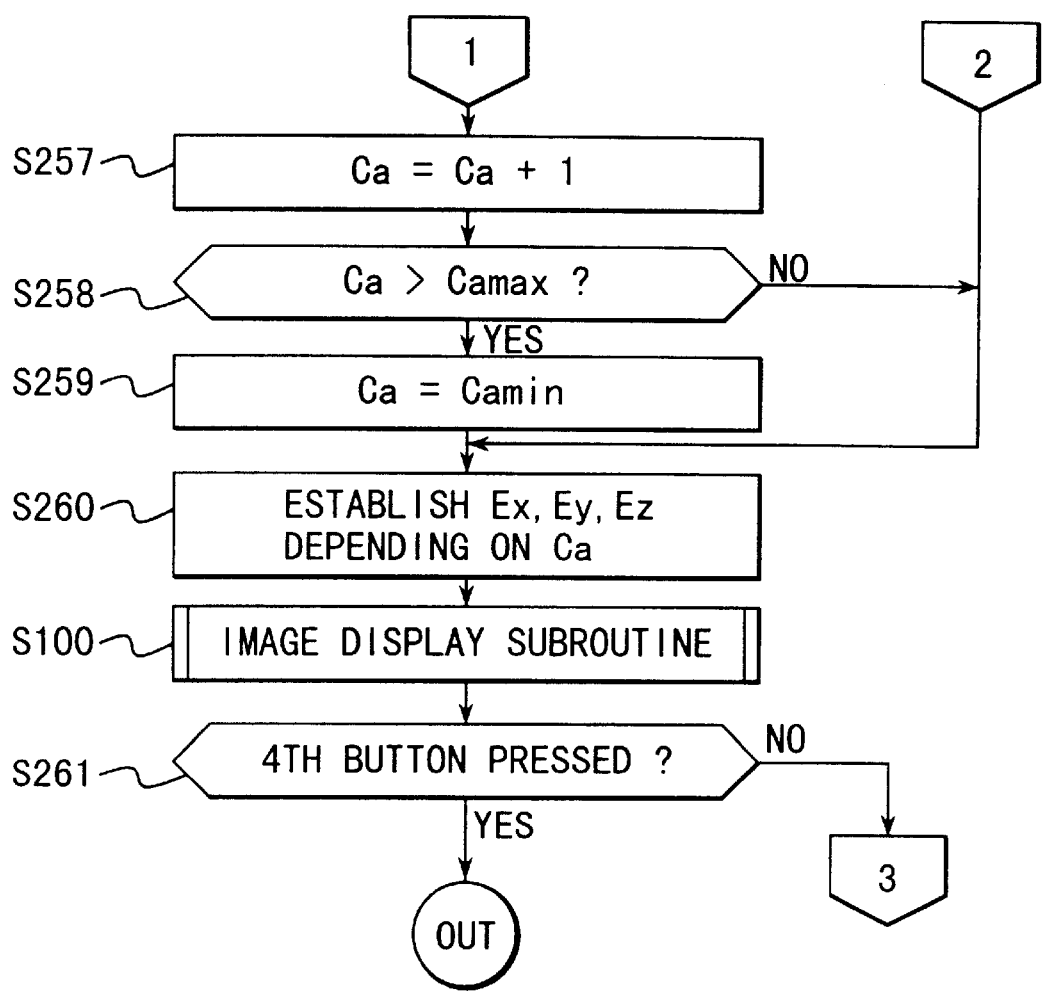

FIGS. 15 and 16 are flowcharts of a control sequence according to the camera position establishing subroutine in the step S250 shown in FIG. 7. In the illustrated embodiment, the camera position can be established behind, in front of, on the left side of, and on the right side of, etc., the golfer Ma. A camera position setting indicative to the camera position is represented by viewpoint position data. Therefore, viewpoint position data depending on a camera position setting are selected, and an image corresponding to the selected viewpoint position data is outputted. The camera position setting is incremented or decremented each time the right key R or the left key L is pressed once.

As shown in FIG. 15, in a step S251, the button operation detecting means 1a determines whether an arrow key has been pressed or not by the game player. If an arrow key has been pressed (YES), then control proceeds to a step S252.

In the step S252, the button operation detecting means 1a determines whether the pressed arrow key is the right key R or not. If the pressed arrow key is the right key R (YES), then control proceeds to a step S257 (see FIG. 16). If not (NO), then control goes to a step S253.

In the step S253, the button operation detecting means 1a determines whether the pressed arrow key is the left key L or not. If the pressed arrow key is the left key L (YES), then control proceeds to a step S254. If not (NO), then control goes back to the step S251.

In the step S254, the calculating means 1d subtracts "1" from a camera position setting Ca.

In a next step S255, the decision means 1f determines whether the camera position setting Ca is greater than a camera position setting minimum value Camin or not. If the camera position setting Ca is greater than the camera position setting minimum value Camin (YES), then control proceeds to a step S256. If not (NO), then control jumps to a step S260 (see FIG. 16).

In the step S256, the variable setting means 1h substitutes a camera position setting maximum value Camax in the camera position setting Ca.

In the step S257, the calculating means 1d adds "1" to the camera position setting Ca.

In a step S258, the decision means 1f determines whether the camera position setting Ca is greater than the camera position setting maximum value Camax or not. If the camera position setting Ca is greater than the camera position setting maximum value Camax (YES), then control proceeds to a step S259. If not (NO), then control jumps to the step S260.

In the step S259, the variable setting means 1h substitutes the camera position setting minimum value Camin in the camera position setting Ca.

In the step S260, the variable setting means 1h establishes viewpoint position data Ex, Ey, Ez depending on the camera position setting Ca. As described above, the camera position setting Ca is represented by viewpoint position data. Viewpoint position data with respect to camera position settings Ca are registered in a table. The variable setting means 1h establishes viewpoint position data Ex, Ey, Ez depending on the camera position setting Ca by reading them from the table in relation to the camera position setting Ca.

In a step S100 following the step S260, the CPU 1 executes the image display subroutine to display a graphic image based on the viewpoint position data Ex, Ey, Ez established in the step S260.

In a next step S261, the button operation detecting means 1a determines whether the fourth button 22f has been pressed or not by the game player. If pressed (YES), then control finishes the camera position establishing subroutine. If not (NO), then control goes back to the step S251.

Figure 17:
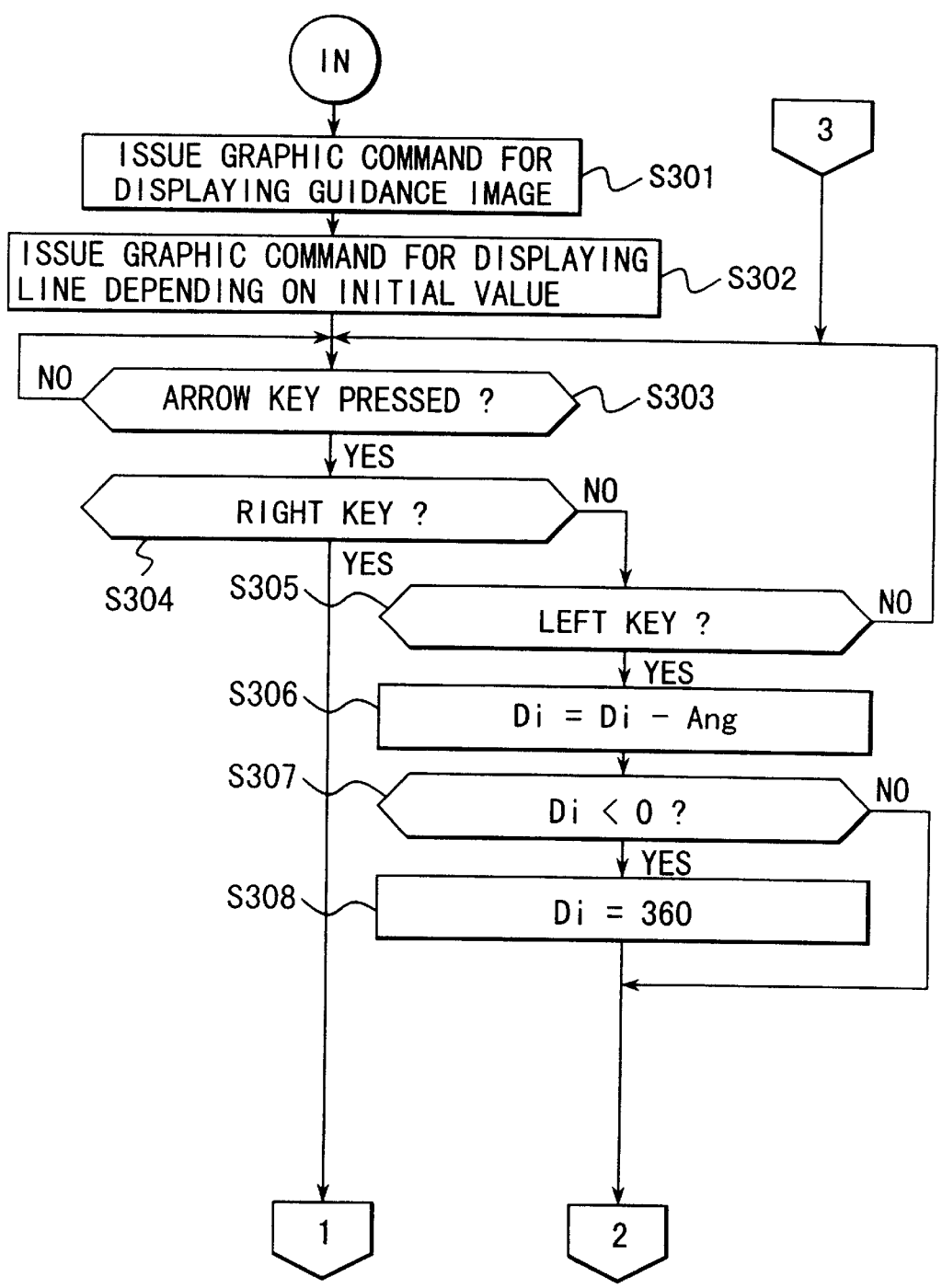
FIGS. 17 and 18 are flowcharts of a control sequence according to a direction establishing subroutine included in the main routine.
Figure 18:
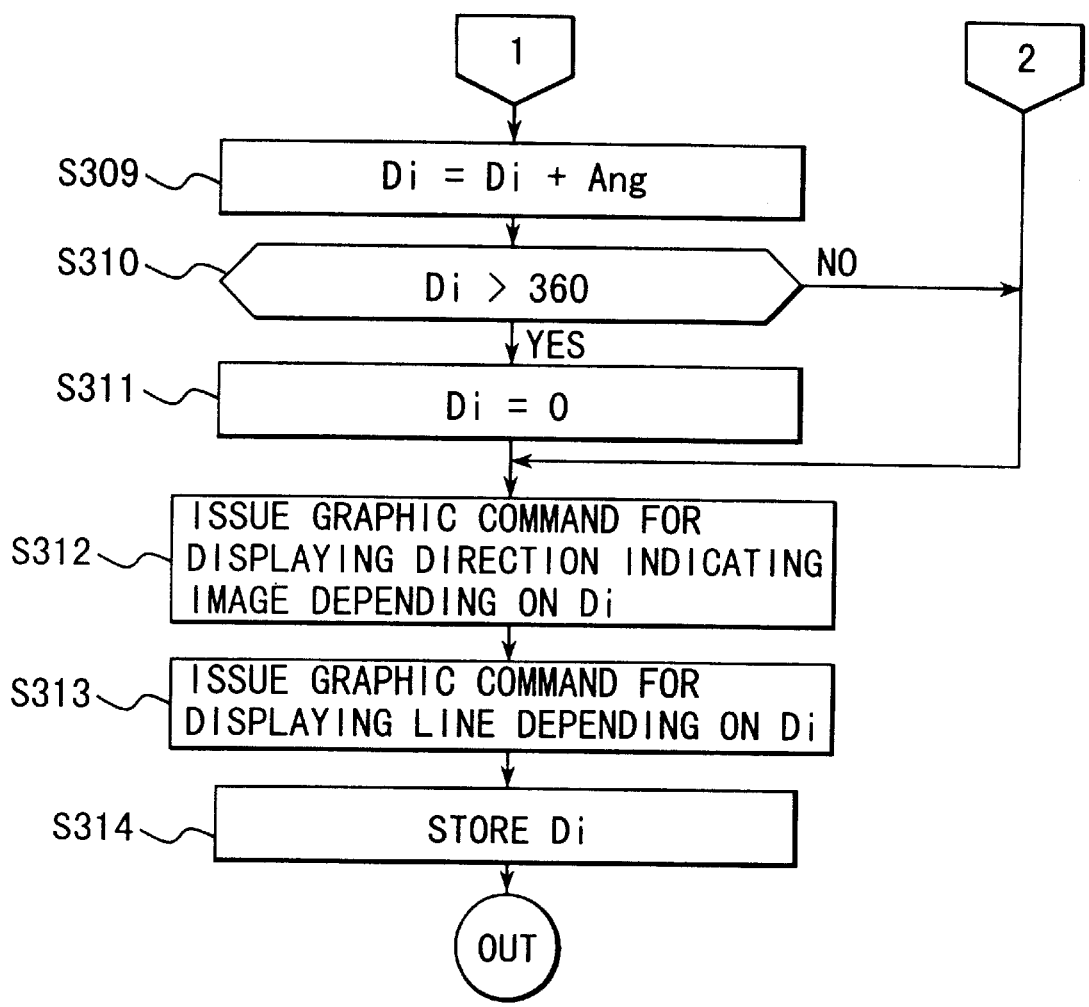

FIGS. 17 and 18 are flowcharts of a control sequence according to the direction establishing subroutine included in the step S300 shown in FIG. 7. In the direction establishing subroutine, the direction represents the orientation of the body of the golfer in the golf game space, i.e., angle data indicative of a direction in which the golf ball is hit. In the golf game space, the golf ball moves in a direction indicated by the angle data depending on a direction setting. The direction setting is incremented or decremented by reference angle data Ang each time the right key R or the left key L is pressed once.

As shown in FIG. 17, in a step S301, the graphic command issuing means ig issues a graphic command for displaying a guidance image to the graphic processor 10. In response to the supplied graphic command, the graphic processor 10 stores the data of a guidance image in the display area of the buffer 11, and displays the guidance image for establishing a direction in the display area Ar3 on the display screen of the television monitor 12 and also displays the guide Gu1 (see FIG. 5) in the right display area on the display screen of the television monitor 12.

In a step S302, the graphic command issuing means 1g issues a graphic command for displaying a line depending on an initial value to the graphic processor 10. In response to the supplied graphic command, the graphic processor 10 stores the data of a line extending from a starting point address to an ending point address in the buffer 11. This line represents the indicator image In in the guide Gu1 shown in FIG. 5.

In a step S303, the button operation detecting means 1a determines whether an arrow key has been pressed or not by the game player. If an arrow key has been pressed (YES), then control proceeds to a step S304.

In the step S304, the button operation detecting means 1a determines whether the pressed arrow key is the right key R or not. If the pressed arrow key is the right key R (YES), then control proceeds to a step S309 (see FIG. 18). If not (NO), then control goes to a step S305.

In the step S305, the button operation detecting means 1a determines whether the pressed arrow key is the left key L or not. If the pressed arrow key is the left key L (YES), then control proceeds to a step S306. If not (NO), then control goes back to the step S303.

In the step S306, the calculating means 1d subtracts the reference angle data Ang from a direction setting Di.

In a next step S307, the decision means 1f determines whether the direction setting Di is smaller than "0" or not. If the direction setting Di is smaller than "0" (YES), then control proceeds to a step S308. If not (NO), then control jumps to a step S312 (see FIG. 18).

In the step S308, the variable setting means 1h substitutes "360" in the direction setting Di.

In the step S309, the calculating means 1d adds the reference angle data Ang to the direction setting Di.

In a next step S310, the decision means 1f determines whether the direction setting Di is greater than "360" or not. If the direction setting Di is greater than "360" (YES), then control proceeds to a step S311. If not (NO), then control jumps to the step S312.

In the step S311, the variable setting means 1h substitutes "0" in the direction setting Di.

In the step S312, the graphic command issuing means 1g issues a graphic command for displaying a direction indicating image depending on the direction setting Di to the graphic controller 10. The display area Ar3 shown in FIG. 5 now displays a direction indicating image depending on the direction setting Di.

In a next step S313, the graphic command issuing means 1g issues a graphic command for displaying a line to the graphic controller 10. In response to the supplied command, the graphic controller 10 stores the data of a line extending from a starting point address to an ending point address in the buffer 11. Therefore, the line In in the guide Gu1 displayed on the display screen of the television monitor 12 is also displayed depending on the direction setting Di.

In a step S314, the parameter managing means 1o stores the direction setting Di in the main memory 5.

Figure 19:
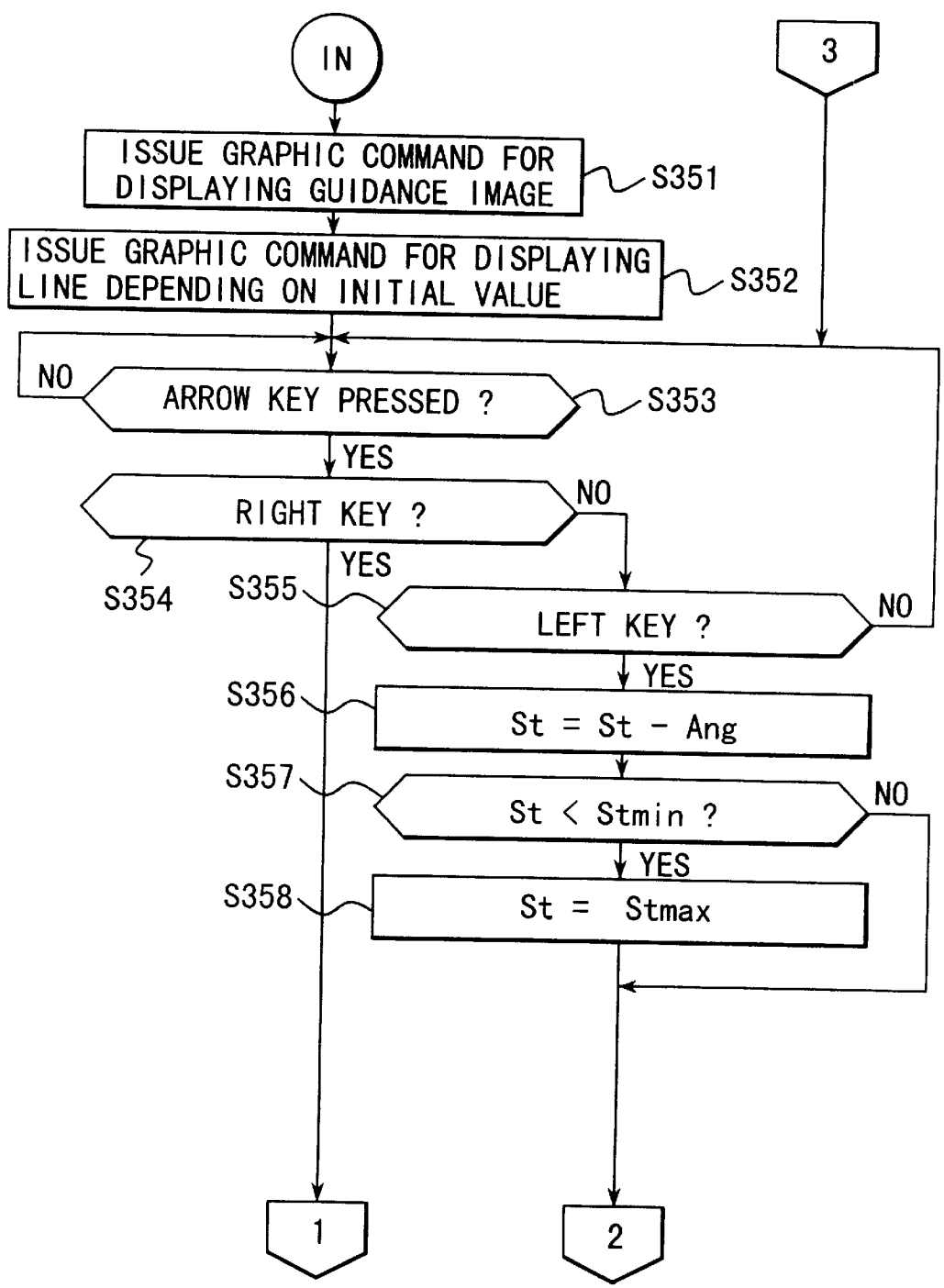
FIGS. 19 and 20 are flowcharts of a control sequence according to a stance establishing subroutine included in the main routine.
Figure 20:
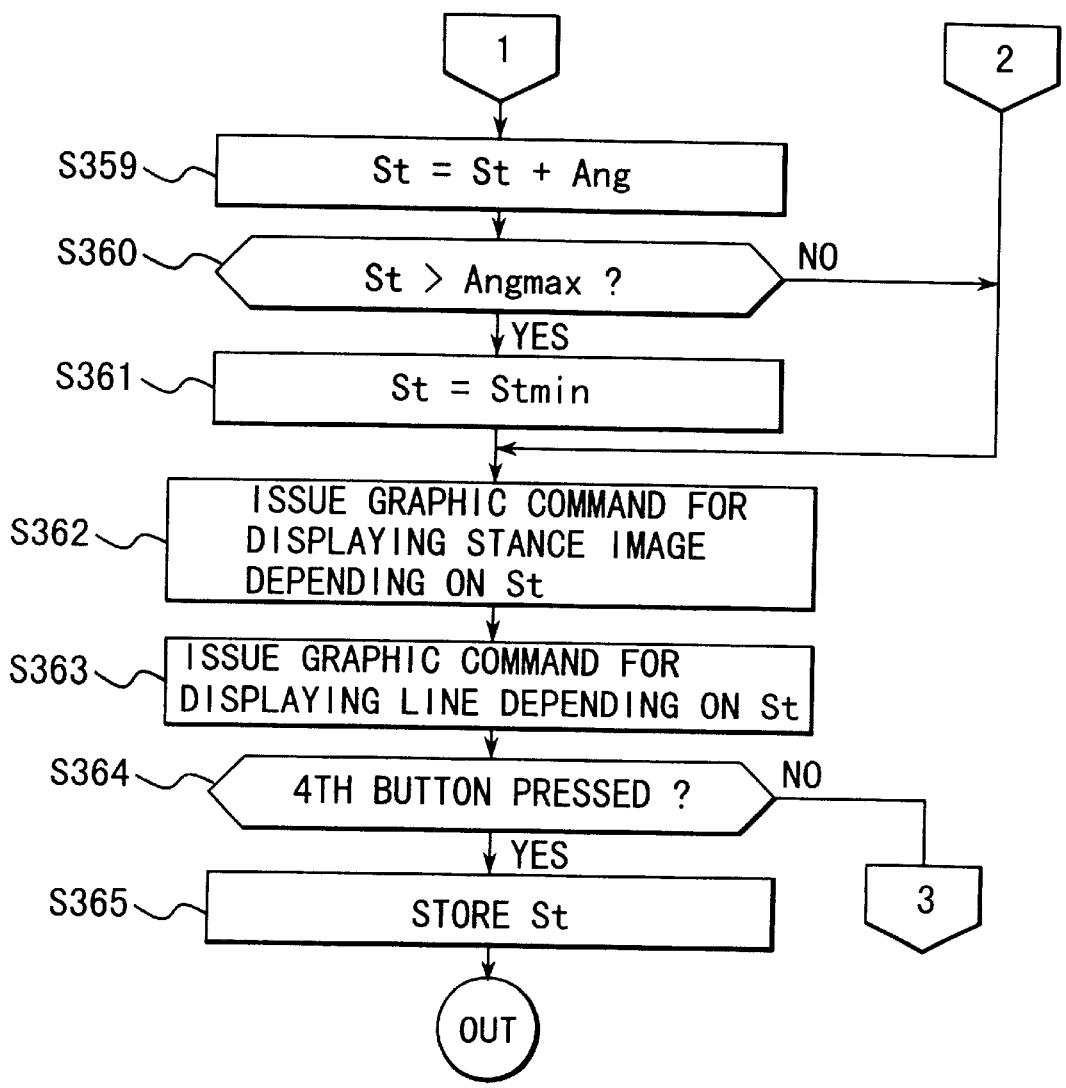

FIGS. 19 and 20 are flowcharts of a control sequence according to the stance establishing subroutine in the step S350 shown in FIG. 8. In the stance establishing subroutine, the stance represents placement of the feet of the golfer as described above.

As shown in FIG. 18, in a step S351, the graphic command issuing means 1g issues a graphic command for displaying a guidance image to the graphic processor 10. In response to the supplied graphic command, the graphic processor 10 stores the data of a guidance image in the display area of the buffer 11, and displays the guidance image for establishing a stance in the display area Ar3 on the display screen of the television monitor 12 and also displays the guide Gu1 (see FIG. 5) in the right display area on the display screen of the television monitor 12.

In a step S352, the graphic command issuing means 1g issues a graphic command for displaying a line depending on an initial value to the graphic processor 10. In response to the supplied graphic command, the graphic processor 10 stores the data of a line extending from a starting point address to an ending point address in the buffer 11. This line represents the indicator image In in the guide Gu1 shown in FIG. 5.

In a step S353, the button operation detecting means 1a determines whether an arrow key has been pressed or not by the game player. If an arrow key has been pressed (YES), then control proceeds to a step S354.

In the step S354, the button operation detecting means 1a determines whether the pressed arrow key is the right key R or not. If the pressed arrow key is the right key R (YES), then control proceeds to a step S359 (see FIG. 20). If not (NO), then control goes to a step S355.

In the step S355, the button operation detecting means 1a determines whether the pressed arrow key is the left key L or not. If the pressed arrow key is the left key L (YES), then control proceeds to a step S356. If not (NO), then control goes back to the step S353.

In the step S356, the calculating means 1d subtracts the reference angle data Ang from a stance setting St.

In a next step S357, the decision means 1f determines whether the stance setting St is smaller than a stance setting minimum value Stmin or not. If the stance setting St is smaller than the stance setting minimum value Stmin (YES), then control proceeds to a step S358. If not (NO), then control jumps to a step S362 (see FIG. 20).

In the step S358, the variable setting means 1h substitutes a stance setting maximum value Stmax in the stance setting St.

In the step S359, the calculating means 1d adds the reference angle data Ang to the stance setting St.

In a next step S360, the decision means 1f determines whether the stance setting St is greater than an angle data maximum value Angmax or not. If the stance setting St is greater than the angle data maximum value Angmax (YES), then control proceeds to a step S361. If not (NO), then control jumps to the step S362.

In the step S361, the variable setting means 1h substitutes the stance setting minimum value Stmin in the stance setting St.

In the step S362, the graphic command issuing means 1g issues a graphic command for displaying a stance image depending on the stance setting St to the graphic controller 10. The display area Ar3 shown in FIG. 5 now displays a stance image depending on the stance setting St.

In a next step S363, the graphic command issuing means 1g issues a graphic command for displaying a line to the graphic controller 10. In response to the supplied command, the graphic controller 10 stores the data of a line extending from a starting point address to an ending point address in the buffer 11. Therefore, the line In in the guide Gu1 displayed on the display screen of the television monitor 12 is also displayed depending on the stance setting St.

In a step S364, the button operation detecting means 1a determines whether the fourth button 22f has been pressed or not by the game player. If pressed (YES), then control proceeds to a step S365. If not (NO), then control goes back to the step S353.

In the step S365, the parameter managing means 1o stores the stance setting St in the main memory 5.

Figure 21:
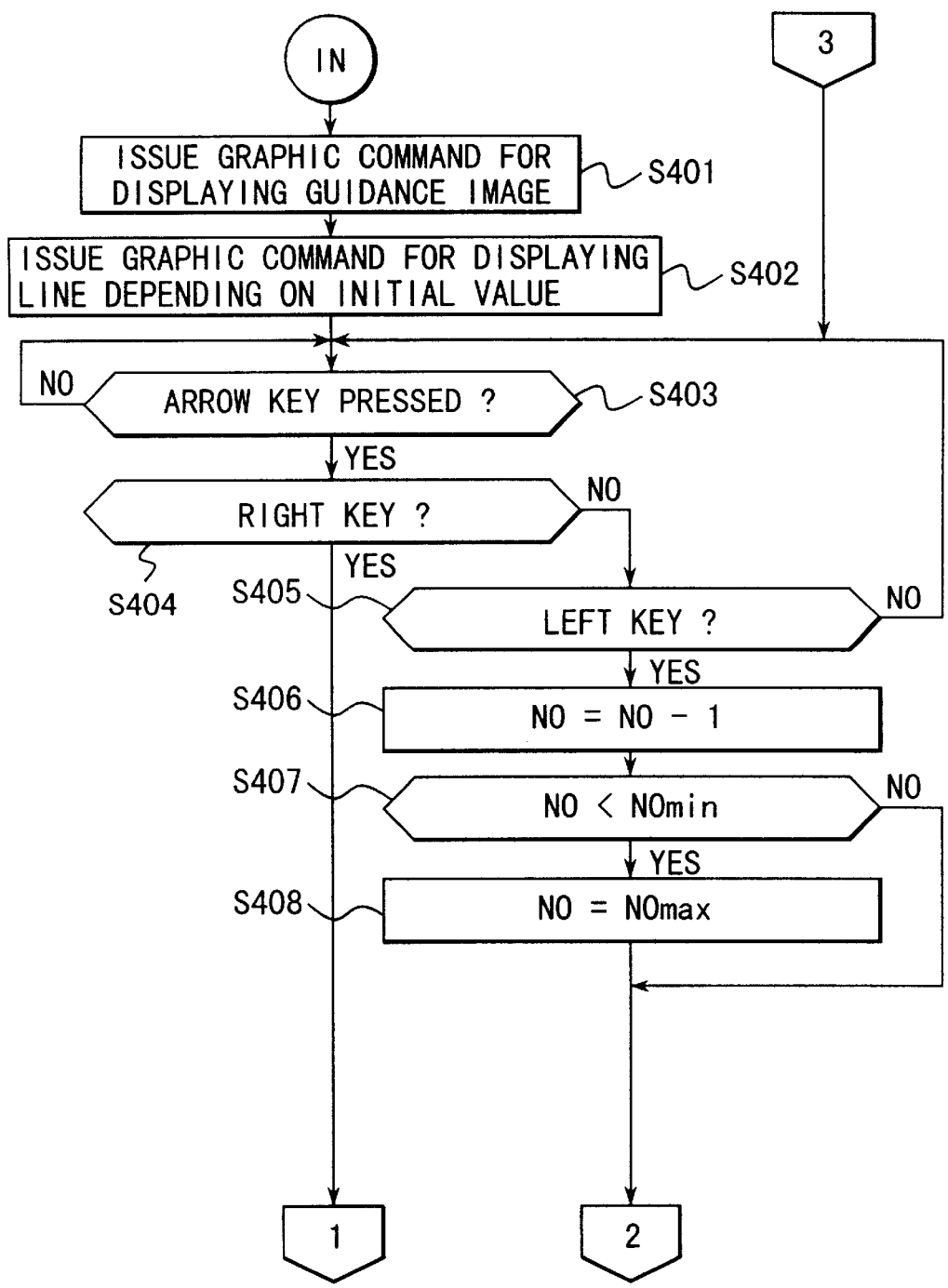
FIGS. 21 and 22 are flowcharts of a control sequence according to a club establishing subroutine included in the main routine.
Figure 22:
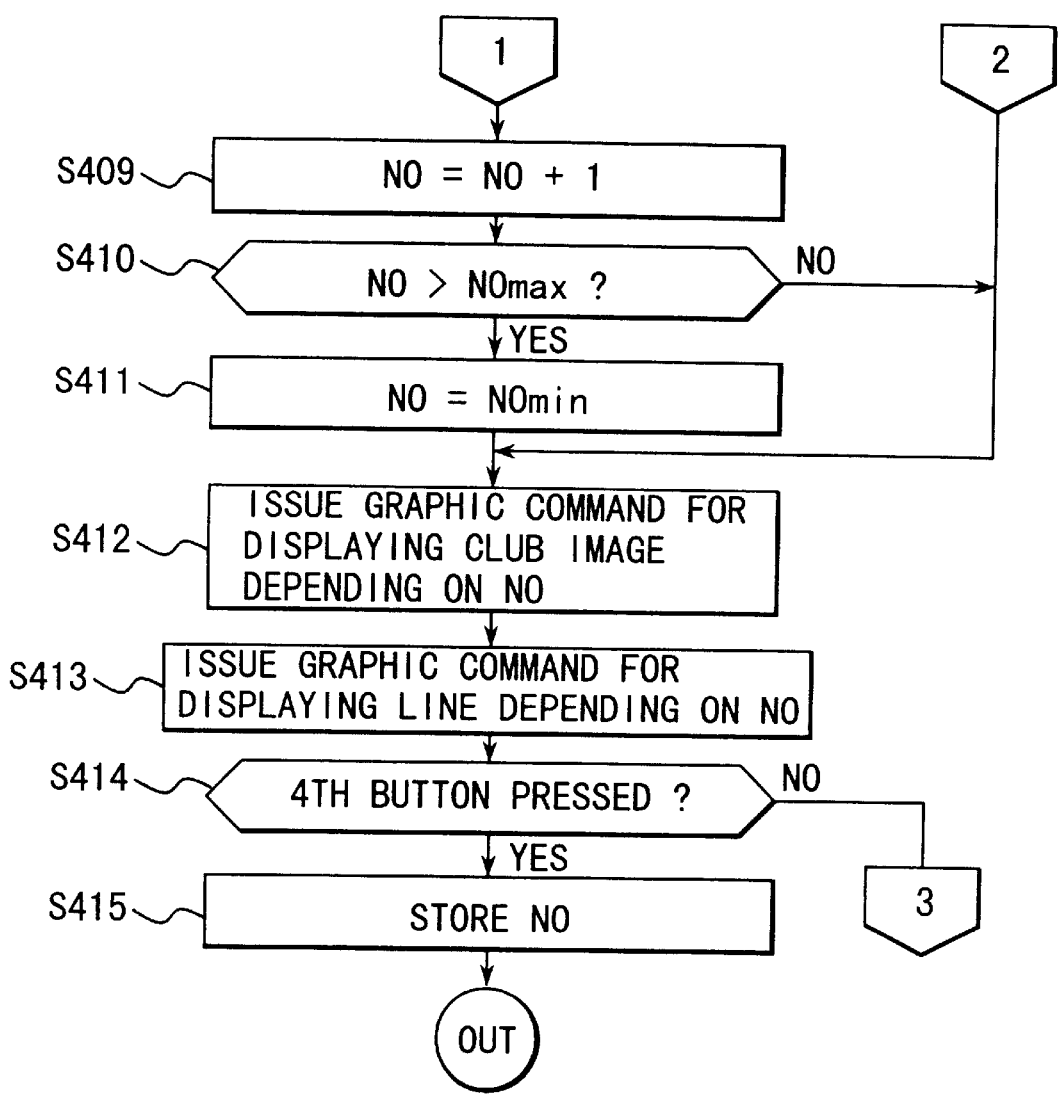

FIGS. 21 and 22 are flowcharts of a control sequence according to the club establishing subroutine in the step S400 shown in FIG. 8. The club establishing subroutine selects a golf club to be used in the golf game.

The club establishing subroutine uses club number data NO. One club number data NO is assigned texture address data representing one club image. Club number data NO and texture address data are stored in a table. The club number data NO is increment or decrement each time an arrow key is pressed once. Texture address data corresponding to certain club number data NO are read from the table, and supplied to the graphic processor 10. Then, the graphic processor 10 reads image data of a golf club corresponding to the texture address data from the non-display area of the buffer 11, and stores the image data in the display area of the buffer 11. Therefore, the display area Ar3 on the display screen of the television monitor 12 displays the image of the golf club.

As shown in FIG. 21, in a step S401, the graphic command issuing means 1g issues a graphic command for displaying a guidance image to the graphic processor 10. In response to the supplied graphic command, the graphic processor 10 stores the data of a guidance image in the display area of the buffer 11, and displays the guidance image which represents a selected golf club in the display area Ar3 on the display screen of the television monitor 12 and also displays the guide Gu1 (see FIG. 5) in the right display area on the display screen of the television monitor 12.

In a step S402, the graphic command issuing means 1g issues a graphic command for displaying a line depending on an initial value to the graphic processor 10. In response to the supplied graphic command, the graphic processor 10 stores the data of a line extending from a starting point address to an ending point address in the buffer 11. This line represents the indicator image In in the guide Gu1 shown in FIG. 5. The guide Gu1 represents a reduced image of the golf course which is presently selected. With the indicator image In displayed in the guide Gu1, the game player can now predict a trajectory which will be followed by the golf ball, a distance which will be traversed by the golf ball, and a position at which the golf ball will arrive, if the game player operates the controller 22 to cause the golfer Ma in the golf game space to tee off the golf ball with present settings.

In a step S403, the button operation detecting means 1a determines whether an arrow key has been pressed or not by the game player. If an arrow key has been pressed (YES), then control proceeds to a step S404.

In the step S404, the button operation detecting means 1a determines whether the pressed arrow key is the right key R or not. If the pressed arrow key is the right key R (YES), then control proceeds to a step S409 (see FIG. 22). If not (NO), then control goes to a step S405.

In the step S405, the button operation detecting means 1a determines whether the pressed arrow key is the left key L or not. If the pressed arrow key is the left key L (YES), then control proceeds to a step S406. If not (NO), then control goes back to the step S403.

In the step S406, the calculating means 1d subtracts "1" from club number data NO.

In a next step S407, the decision means 1f determines whether the club number data NO is smaller than a club number data minimum value NOmin or not. If the club number data NO is smaller than the club number data minimum value NOmin (YES), then control proceeds to a step S408. If not (NO), then control jumps to a step S412 (see FIG. 22).

In the step S408, the variable setting means 1h substitutes a club number data maximum value NOmax in the club number data NO.

In the step S409, the calculating means 1d adds "1" to the club number data NO.

In a next step S410, the decision means 1f determines whether the club number data NO is greater than the club number data maximum value NOmax or not. If the club number data NO is greater than the club number data maximum value NOmax (YES), then control proceeds to a step S411. If not (NO), then control jumps to the step S412.

In the step S411, the variable setting means 1h substitutes the club number data minimum value Nomin in the club number data NO.

In the step S412, the graphic command issuing means 1g issues a graphic command for displaying a club image depending on the club number data NO to the graphic controller 10. The display area Ar3 shown in FIG. 5 now displays a club image depending on the club number data NO.

In a next step S413, the graphic command issuing means 1g issues a graphic command for displaying a line to the graphic controller 10. In response to the supplied command, the graphic controller 10 stores the data of a line extending from a starting point address to an ending point address in the buffer 11. Therefore, the line In in the guide Gu1 displayed on the display screen of the television monitor 12 is also displayed depending on the club number data NO.

In a step S414, the button operation detecting means 1a determines whether the fourth button 22f has been pressed or not by the game player. If pressed (YES), then control proceeds to a step S415. If not (NO), then control goes back to the step S403.

In the step S415, the parameter managing means 1o stores the club number data NO in the main memory 5.

Figure 3C:
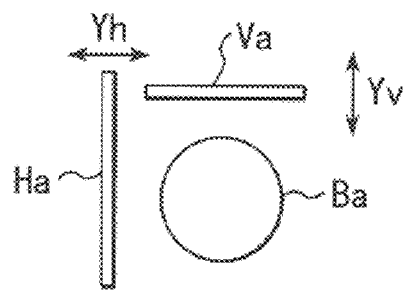
Figure 23:
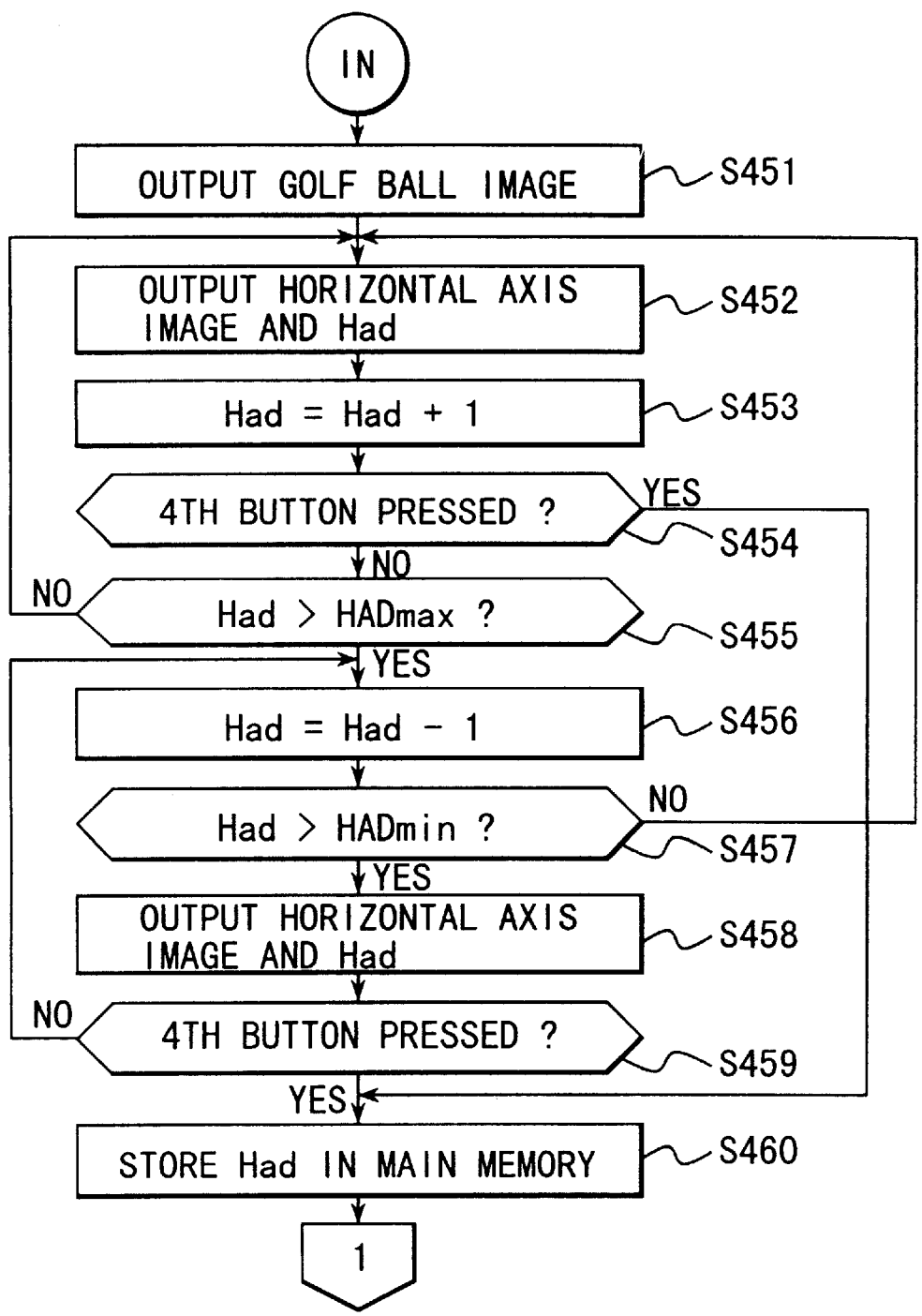
FIGS. 23 and 24 are flowcharts of a control sequence according to a hitting position establishing subroutine included in the main routine.
Figure 24:
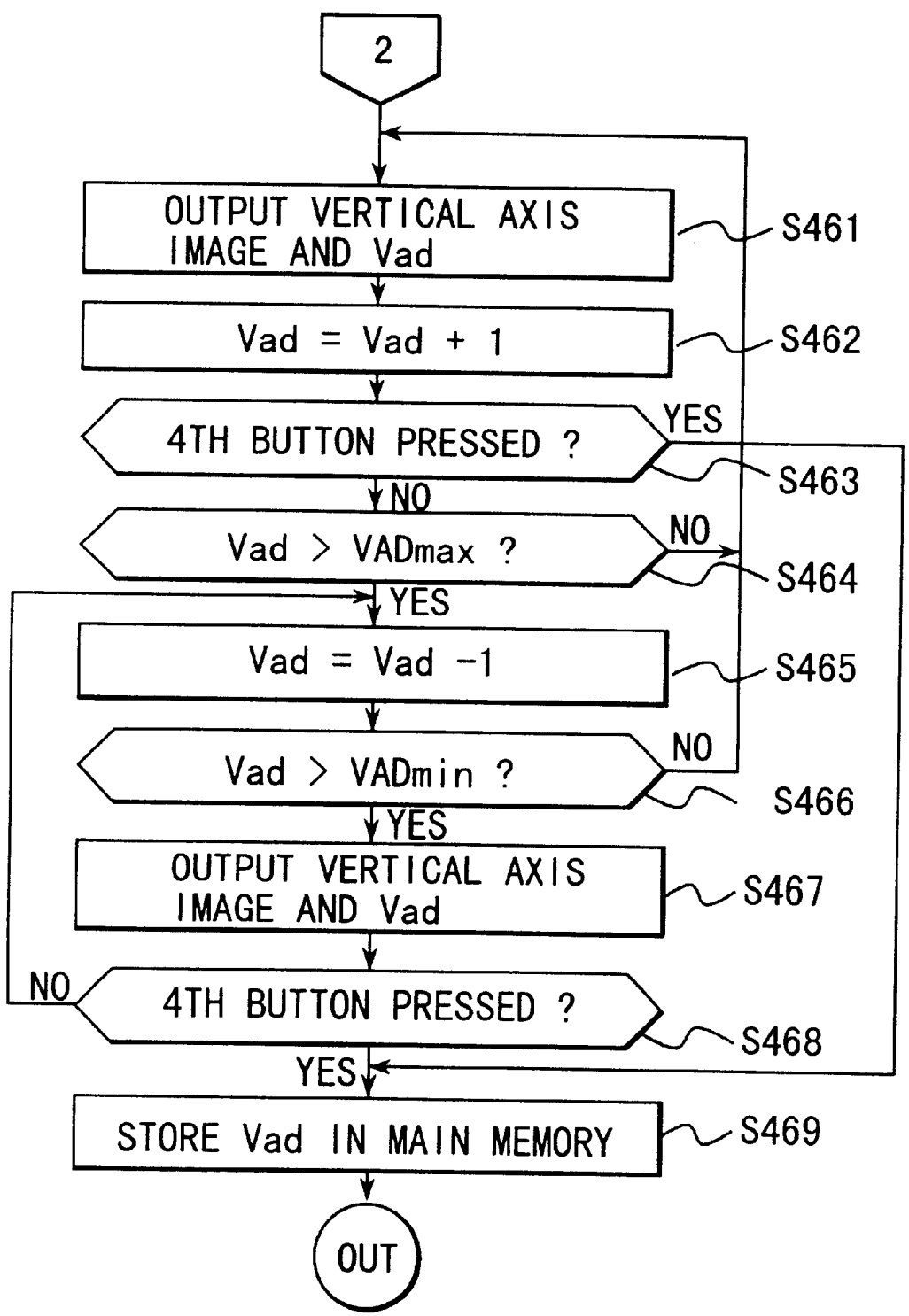

FIGS. 23 and 24 are flowcharts of a control sequence according to the hitting position establishing subroutine in the step S450 shown in FIG. 8. The hitting position establishing subroutine establishes which part of the golf ball is hit by the head of the golf club that has been selected in the club establishing subroutine in the step S400 shown in FIG. 8. Data indicative of which part of the golf ball is hit by the head of the golf club comprise address data Had whose vertical address is fixed and horizontal address is variable and address data Vad whose horizontal address is fixed and vertical address is variable, as shown in FIG. 3C.

As shown in FIG. 23, in a step S451, the graphic command issuing means 1g issues a graphic command for displaying a graphic image of a golf ball to the graphic processor 10. In response to the supplied graphic command, the graphic processor 10 stores the image data of the golf ball in the display area of the buffer 11. Now, the graphic image of the golf ball is displayed substantially centrally on the display screen of the television monitor 12 shown in FIG. 5.

In a step S452, the graphic command issuing means 1g issues a graphic command for displaying a horizontal axis image Ha to the graphic processor 10, the graphic command including address data Had in the display area of the buffer 11. The graphic processor 10 then stores the data of the horizontal axis image Ha in the display area of the buffer 11 at a position indicated by the address data Had. The horizontal axis image Ha is now displayed on the display screen of the television monitor 12 as shown in FIG. 3C.

In a step S453, the calculating means 1d adds "1" to the address data Had.

In a step S454, the button operation detecting means 1a determines whether the fourth button 22f has been pressed or not by the game player. If pressed (YES), then control jumps to a step S460. If not (NO), then control proceeds to a step S455.

In the step S455, the decision means 1f determines whether the address data Had are greater than an address data maximum value HADmax or not. If the address data Had are greater than the address data maximum value HADmax (YES), then control proceeds to a step S456. If not (NO), then control goes back to the step S452.

In the step S456, the calculating means 1d subtracts "1" from the address data Had.

In a step S457, the decision means 1f determines whether the address data Had are greater than an address data minimum value HADmin or not. If the address data Had are greater than the address data minimum value HADmin (YES), then control proceeds to a step S458. If not (NO), then control goes back to the step S452.

In the step S458, the graphic command issuing means 1g issues a graphic command for displaying a horizontal axis image Ha to the graphic processor 10, the graphic command including address data Had in the display area of the buffer 11. The graphic processor 10 then stores the data of the horizontal axis image Ha in the display area of the buffer 11 at a position indicated by the address data Had. The horizontal axis image Ha is now displayed on the display screen of the television monitor 12 as shown in FIG. 3C.

In a step S459, the button operation detecting means 1a determines whether the fourth button 22f has been pressed or not by the game player. If pressed (YES), then control proceeds to the step S460. If not (NO), then control goes back to the step S456. Therefore, insofar as the fourth button 22f is not pressed, the above steps are repeated, moving the horizontal axis image Ha shown in FIG. 3C horizontally as indicated by the arrow Yh on the display screen of the television monitor 12. When the fourth button 22f is pressed, a position for hitting the golf ball in a horizontal direction is determined.

In the step S460, the parameter managing means 1o stores the address data Had in the main memory 5.

In a step S461, the graphic command issuing means 1g issues a graphic command for displaying a vertical axis image Va to the graphic processor 10, the graphic command including address data Vad in the display area of the buffer 11. The graphic processor 10 then stores the data of the vertical axis image Va in the display area of the buffer 11 at a position indicated by the address data Vad. The vertical axis image Va is now displayed on the display screen of the television monitor 12 as shown in FIG. 3C.

In a step S462, the calculating means 1d adds "1" to the address data Vad.

In a step S463, the button operation detecting means 1a determines whether the fourth button 22f has been pressed or not by the game player. If pressed (YES), then control jumps to a step S469. If not (NO), then control proceeds to a step S464.

In the step S464, the decision means 1f determines whether the address data Vad are greater than an address data maximum value VADmax or not. If the address data Vad are greater than the address data maximum value VADmax (YES), then control proceeds to a step S465. If not (NO), then control goes back to the step S461.

In the step S465, the calculating means 1d subtracts "1" from the address data Vad.

In a step S466, the decision means 1f determines whether the address data Vad are greater than an address data minimum value VADmin or not. If the address data Had are greater than the address data minimum value VADmin (YES), then control proceeds to a step S467. If not (NO), then control goes back to the step S461.

In the step S467, the graphic command issuing means 1g issues a graphic command for displaying a vertical axis image Va to the graphic processor 10, the graphic command including address data Vad in the display area of the buffer 11. The graphic processor 10 then stores the data of the vertical axis image Va in the display area of the buffer 11 at a position indicated by the address data Vad. The vertical axis image Va is now displayed on the display screen of the television monitor 12 as shown in FIG. 3C.

In a step S468, the button operation detecting means 1a determines whether the fourth button 22f has been pressed or not by the game player. If pressed (YES), then control proceeds to the step S469. If not (NO), then control goes back to the step S465. Therefore, insofar as the fourth button 22f is not pressed, the above steps are repeated, moving the vertical axis image Va shown in FIG. 3C vertically as indicated by the arrow Yv on the display screen of the television monitor 12. When the fourth button 22f is pressed, a position for hitting the golf ball in a vertical direction is determined.

In the step S469, the parameter managing means 1o stores the address data Vad in the main memory 5.

Thereafter, the hitting position establishing subroutine in the step S450 shown in FIG. 8 comes to an end.

Figure 25:
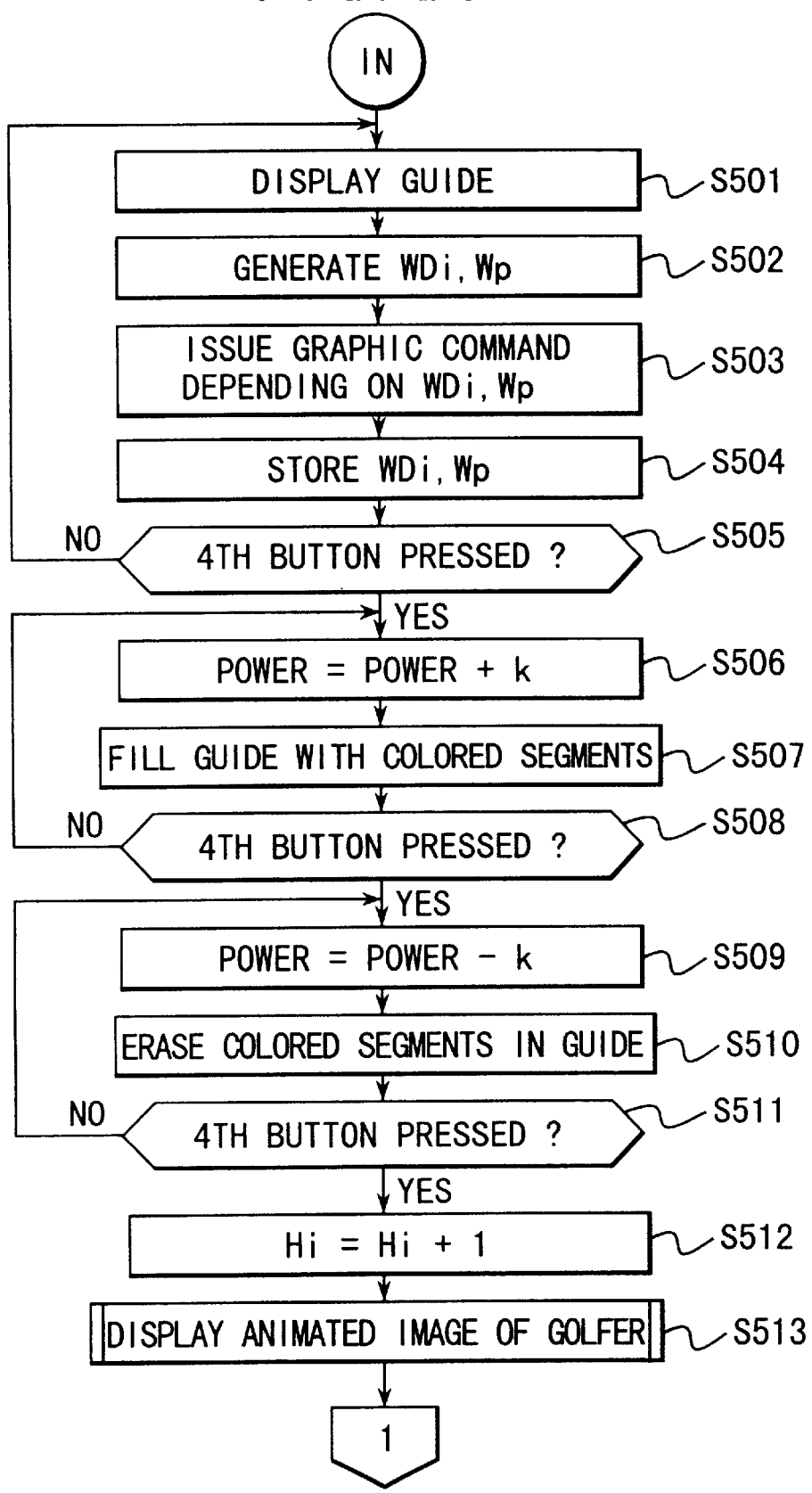
FIGS. 25 and 26 are flowcharts of a control sequence according to a hitting subroutine included in the main routine.
Figure 26:
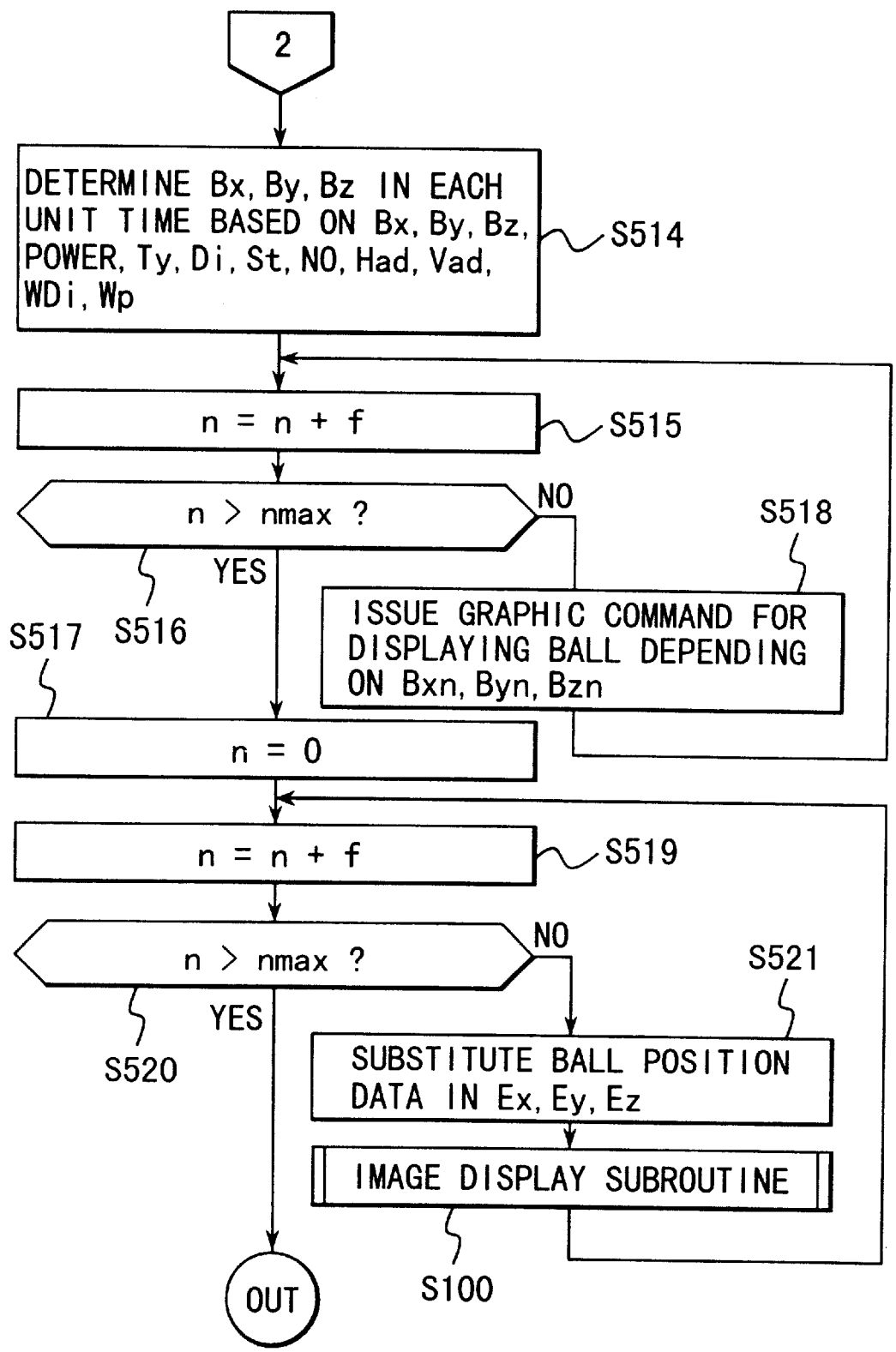

FIGS. 25 and 26 are flowcharts of a control sequence according to the hitting subroutine in the step S500 shown in FIG. 8. In the hitting subroutine, the game player operates the controller 22 to enable the golfer Ma in the golf game space displayed on the display screen of the television monitor 12 to hit the golf ball. The hitting subroutine processes the data of graphic images until the golf ball hit by the golfer Ma drops and comes to a stop in the golf game space.

Figure 3D:
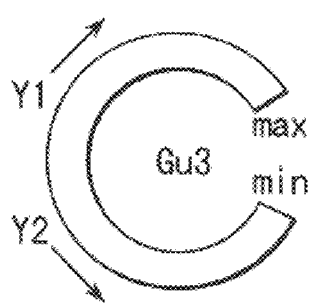

In a step S501, the graphic command issuing means 1g issues a graphic command for displaying a graphic image of a hitting guide Gu3 shown in FIG. 3D to the graphic processor 10. In response to the supplied graphic command, the graphic processor 10 stores the data of the graphic image of the guide Gu3 in the display area of the buffer 11. The graphic image of the guide Gu3 is now displayed substantially centrally on the display screen of the television monitor 12.

The guide Gu3 will be described below. The guide Gu3 is a graphic image for indicating to the game player the strength (hereinafter referred to as "energy") with which to hit the golf ball under the control of the controller 22 when the game player operates the controller 22 to cause the golfer Ma in the golf game space to hit the golf ball. As shown in FIG. 3D, the graphic image of the guide Gu3 comprises a doughnut shape partly cut away with a recess. An upper end of the recess is marked with letters "max" and a lower end with letters "min". The mark "max" represents a maximum level of energy with which to hit the golf ball, and the mark "min" represents a minimum level of energy with which to hit the golf ball.

When the fourth button 22f is pressed while the guide Gu3 is being displayed, the guide Gu3 starts being colored progressively from the end marked with "min" toward the end marked with "max" as long as the fourth button 22f is pressed. Specifically, the guide Gu3 starts being progressively filled with segments that are colored with respective successive hues including, for example, yellow, pale aqua, blue, purple, and red. The leading end of the colored segments represents the present level of energy with which to hit the golf ball. Therefore, the longer the time in which the fourth button 22f is pressed, the greater the energy with which to hit the golf ball.

When the fourth button 22f is released while the guide Gu3 is being displayed, the colored segments start being successively eliminated. In the above example, the segments that are colored with the respective successive hues of yellow, pale aqua, blue, purple, and red are successively eliminated from the end marked with "max" toward the end marked with "min". The leading end of the colored segments represents the present level of energy with which to hit the golf ball. Therefore, the longer the time in which the fourth button 22f is released, the smaller the energy with which to hit the golf ball. When the fourth button 22f is pressed again after it has been released, the present level of energy with which to hit the golf ball is fixed. After the present level of energy with which to hit the golf ball is fixed, the golf ball is hit. The above description of the guide Gu3 corresponds to steps S501, S505~S511 as described below.

In a step S502, the random number generating means 1p randomly generates values representative of a wind direction WDi and a wind power Wp.

In a step S503, the graphic command issuing means 1g issues a graphic command for displaying characters representative of the wind power Wp and an arrow image representative of the wind direction WDi to the graphic processor 10. In response to the supplied graphic command, the graphic processor 10 stores image data indicative of a wind power, a title, and an arrow in the display area of the buffer 11. The display screen of the television monitor 12 now displays an arrow By indicative of the wind direction WDi, the title of the wind power ("WIND") and the value of the wind power ("4 m", for example).

In a step S504, the parameter managing means $1o$ stores the data of the wind direction WDi and the wind power Wp in the main memory 5.

In a step S505, the button operation detecting means $1a$ determines whether the fourth button $22f$ has been pressed or not by the game player. If pressed (YES), then control proceeds to a step S506. If not (NO), then control goes back to the step S501.

In the step S506, the calculating means $1d$ adds reference data k to hitting energy data POWER.

In a step S507, the graphic command issuing means $1g$ issues a graphic command for displaying lines, which correspond to the value of the hitting energy data POWER, to the graphic processor 10. This graphic command serves to display lines with indicated hues within the guide Gu3 and from its outer circumferential edge toward its inner circumferential edge (or from its inner circumferential edge toward its outer circumferential edge). In response to the supplied graphic command, the graphic processor 10 stores as much line data as the value of the hitting energy data POWER in the data of the guide Gu3 stored in the buffer 11. The guide Gu3 displayed on the display screen of the television monitor 12 is now progressively filled with segments that are colored with respective successive hues.

In a step S508, the button operation detecting means $1a$ determines whether the fourth button $22f$ has been released or not by the game player. If released (YES), then control proceeds to a step S509. If not (NO), then control goes back to the step S506.

In the step S509, the calculating means $1d$ subtracts the reference data k from the hitting energy data POWER.

In a step S510, the graphic command issuing means $1g$ issues a graphic command for displaying lines, which correspond to the value of the hitting energy data POWER, to the graphic processor 10. In response to the supplied graphic command, the graphic processor 10 stores as much line data as the value of the hitting energy data POWER in the data of the guide Gu3 stored in the buffer 11. The guide Gu3 displayed on the display screen of the television monitor 12 is colored with corresponding hues. Since the value of the hitting energy data POWER is reduced at this time, the guide Gu3 is displayed on the display screen of the television monitor 12 such that colored segments thereof are progressively reduced in number.

In a step S511, the button operation detecting means $1a$ determines whether the fourth button $22f$ has been pressed or not by the game player. If pressed (YES), then control proceeds to a step S512. If not (NO), then control goes back to the step S509. Pressing the fourth button $22f$ fixes the hitting energy data POWER at this time.

In the step S512, the calculating means $1d$ adds "1" to hitting data Hi, and the parameter managing means $1o$ stores the hitting data Hi in the main memory 5.

In a step S513, the graphic command issuing means $1g$ issues a graphic command for displaying the golfer Ma to the graphic processor 10. In response to the supplied graphic command, the graphic processor 10 stores graphic data of the golfer Ma in the display area of the buffer 11. The display screen of the television monitor 11 now displays a series of animated images of the golfer Ma until the golfer Ma finishes the hitting of the golf ball.

In a step S514 (see FIG. 26), the calculating means $1d$ determines all ball positions Bx, By, Bz in each unit time based on the ball position data Bx, By, Bz, the hitting energy data POWER, the teeing-up setting Ty, the direction setting Di, the stance setting St, the club number data NO, the address data Had, Vad, the wind direction WDi, and the wind power Wp. Each unit time represents each of 30 frames per second according to the NTSC television standards. Therefore, the ball positions Bx, By, Bz are determined for every frame in this embodiment.

The time that is required until the ball comes to a stop differs depending on the various parameters given above. Consequently, if the ball positions Bx, By, Bz are determined for every frame and an image depending on those determined ball positions Bx, By, Bz is displayed for every frame, then the number of frames displayed until the ball comes to a stop differs depending on the various parameters given above. The number of frames until the ball comes to a stop is stored as "nmax" in the main memory 5.

In a next step S515, the calculating means $1d$ adds "f" to a variable n. The letter "f" represents one frame, for example.

In a step S516, the decision means $1f$ determines whether the variable n is greater than a maximum value nmax (as defined above) for the variable n or not. If the variable n is greater than the maximum value nmax (YES), then control proceeds to a step S517. If not (NO), then control goes to a step S518.

In the step S517, the variable setting means $1h$ substitutes "0" in the variable n.

In the step S518, the graphic command issuing means $1g$ issues a graphic command for displaying the ball depending on the ball position data Bxn, Byn, Byz to the graphic processor 10.

In a step S519, the calculating means $1d$ adds "f" to the variable n.

In a step S520, the decision means $1f$ determines whether the variable n is greater than the maximum value nmax or not. If the variable n is greater than the maximum value nmax (YES), then control finishes the hitting subroutine. If not (NO), then control goes to a step S521.

In the step S521, the variable setting means $1h$ substitutes the ball position data Bxn, Byn, Byz respectively in the viewpoint position data Ex, Ey, Ez.

In the step S100 which follows the step S521, the CPU 1 executes the image display subroutine described above. The successive steps S519, S520, S521, S100 serve to reproduce the state of flight of the golf ball that has been hit. The ball position varies from time to time through frames. Therefore, by substituting the ball position data Bxn, Byn, Byz respectively in the viewpoint position data Ex, Ey, Ez, the viewpoint also varies from time to time. Because the viewpoint varies from time to time, the background image also varies from time to time. The display screen of the television monitor 12 thus displays a so-called replay image.

Although a certain preferred embodiment of the present invention has been shown and described in detail, it should be understood that various changes and modifications may be made therein without departing from the scope of the appended claims.

What is claimed is:

1. A video game system comprising:

display means for displaying image information of a terrain profile and image information of a movable object movable on the terrain profile on a display screen;

controller means for entering commands; and control means for moving the movable object displayed on said display screen based on the image information of the terrain profile and a command from said controller means;

said control means comprising:

address establishing means for establishing minimum and maximum addresses of said terrain profile on said display screen;

address acquiring means for acquiring minimum and maximum addresses of a display range in which a guide indicative of terrain features based on the image information of the terrain profile is displayed over said terrain profile;

height data correcting means for correcting height data indicative of heights of portion of the terrain profile in said display range based on a height of the position of said movable object; and guide display means for displaying said guide over said terrain profile with a luminance based on the corrected height data.

2. A video game system according to claim 1, further comprising:

command detecting means for detecting a content of a command from said controller means; and guide output decision means for determining whether the content of the command detected by said command detecting means indicates display of the guide or non-display of the guide.

3. A video game system according to claim 1, wherein said image information indicative of the terrain profile is three-dimensionally displayed on said display screen, and said guide is three-dimensionally displayed as a matrix of said lines over the three-dimensionally displayed image information indicative of the terrain profile on said display screen.

4. A video game system according to claim 1, wherein said image information indicative of the terrain profile comprises a plurality of polygons, and said lines displayed as the guide extend between vertices of said polygons.

5. A video game system according to claim 1, wherein said video game system comprises a golf game system, said image information indicative of the terrain profile comprises image information indicative of a golf course, and said image information of the movable object comprises image information of a golf ball.

6. A video game system according to claim 1, wherein said image information indicative of the terrain profile includes information representative of the height of a vertex, and a luminance of each of said lines is established depending on the relationship between the height of a vertex corresponding to a starting point of the line and the height of a vertex corresponding to an ending point of the line.

7. A video game system according to claim 6, wherein said luminance of each of said lines is established such that the luminance is progressively lower from said starting point toward said ending point if the height of the vertex corresponding to the starting point is greater than the height of the vertex corresponding to the ending point and the luminance is progressively greater from said starting point toward said ending point if the height of the vertex corresponding to the starting point is smaller than the height of the vertex corresponding to the ending point.

8. A method of representing a distance or height in a display space, comprising the steps of:

displaying image information indicative of a terrain profile including at least the height of a reference point on display screen;

displaying lines between said reference points present in a predetermined range of said image information on said display screen; and establishing a progressive luminance of each of said lines depending on the relationship between the height of a reference point corresponding to a starting point of the line and the height of a reference point corresponding to an ending point of the line.

9. A method of displaying a guide in a display space in a video game system for displaying image information indicative of a terrain profile and image information of a movable object on a display screen, and moving the movable object on the display screen based on the image information indicative of the terrain profile and a command from a controller, comprising the steps of:

displaying a guide comprising a plurality of lines on the display screen; and establishing a length of each of said lines and establishing a progressive luminance along the length of each of said lines based on the image information indicative of the terrain profile.

10. A recording medium having recorded therein program data for displaying image information indicative of a terrain profile including at least the height of a vertex on a display screen in which the vertex represents a reference point on the terrain profile, displaying lines between vertices present in a predetermined range of said image information on said display screen, and establishing a progressive luminance of each of said lines depending on the relationship between the height of a vertex corresponding to a starting point of the line and the height of a vertex corresponding to an ending point of the line.

11. A recording medium having recorded therein game program data for displaying image information indicative of a terrain profile and image information of a movable object on a display screen, moving the movable object on the display screen based on the image information indicative of the terrain profile and a command from a controller, displaying a guide comprising a plurality of lines on the display screen, and establishing a progressive luminance and a length of each of said lines based on the image information indicative of the terrain profile.

12. A recording medium according to claim 11, wherein said image information indicative of the terrain profile is three-dimensionally displayed on said display screen, and said guide is three-dimensionally displayed as a matrix of said lines over the three-dimensionally displayed image information indicative of the terrain profile on said display screen.

13. A recording medium according to claim 11, wherein said game program data comprises program data for a golf game, said image information indicative of the terrain profile comprises image information indicative of a golf course, and said image information of a movable object comprises image information of a golf ball.

14. A recording medium according to claim 11, wherein said image information indicative of the terrain profile comprises a plurality of polygons, and said guide is displayed together with said image information indicative of the terrain profile based on a predetermined viewpoint position.

15. A recording medium according to claim 11, wherein a direction in which said movable object is to move is established, and said image information indicative of the terrain profile and said guide are three-dimensionally displayed on said display screen depending on the established direction.

16. A method of representing a distance or height in a display space, comprising the steps of:
displaying image information indicative of a terrain profile including at least the height of a vertex on a display screen in which the vertex is a point on the terrain profile;
displaying lines between vertices present in a predetermined range of said image information on said display screen; and
establishing a luminance of each of said lines depending on the relationship between the height of a vertex corresponding to a starting point of the line and the height of a vertex corresponding to an ending point of the line, the luminance of each of said lines being established such that the luminance is progressively lower from said starting point toward said ending point if the height of the vertex corresponding to the starting point is greater than the height of the vertex corresponding to the ending point and the luminance is progressively greater from said starting point toward said ending point if the height of the vertex corresponding to the starting point is smaller than the height of the vertex corresponding to the ending point.

17. A method of displaying a guide in a display space in a video game system for displaying image information indicative of a terrain profile and image information of a movable object on a display screen, said image information indicative of the terrain profile including information representative of the height of a vertex in which the vertex is a point on the terrain profile, and moving the movable object on the display screen based on the image information indicative of the terrain profile and a command from a controller, comprising the steps of:
displaying a guide comprising a plurality of lines on the display screen; and
establishing a luminance and a length of each of said lines based on the image information indicative of the terrain profile, the luminance of each of said lines being established depending on the relationship between the height of a vertex corresponding to a starting point of the line and the height of a vertex corresponding to an ending point of the line and being established such that the luminance is progressively lower from said starting point toward said ending point if the height of the vertex corresponding to the starting point is greater than the height of the vertex corresponding to the ending point and the luminance is progressively greater from said starting point toward said ending point if the heightof the vertex corresponding to the starting point is smaller than the height of the vertex corresponding to the ending point.

18. A method according to claim 17, further comprising the steps of:
three-dimensionally displaying said image information indicative of the terrain profile on said display screen; and
three-dimensionally displaying said guide as a matrix of said lines over the three-dimensionally displayed image information indicative of the terrain profile on said display screen.

19. A method according to claim 17, wherein said video game system comprises a golf game system, said image information indicative of the terrain profile comprises image information indicative of a golf course, and said image information of the movable object comprises image information of a golf ball.

20. A method according to claim 17, wherein said vertices are vertices of a plurality of polygons, said lines being displayed as the guide extending between vertices of said polygons.

21. A method according to claim 17, further comprising the steps of:
establishing a direction in which said movable object is to move; and
three-dimensionally displaying said image information indicative of the terrain profile and said guide on said display screen depending on the established direction.

22. A method of displaying a guide in a display space in a video game system for displaying image information indicative of a terrain profile and image information of a movable object on a display screen, and moving the movable object on the display screen based on the image information indicative of the terrain profile and a command from a controller, comprising the step of:
displaying a guide comprising a plurality of lines on the display screen based on said image information indicative of the terrain profile, if the command from the controller indicates display of the guide, said step of displaying a guide comprising the steps of:
establishing minimum and maximum addresses of the terrain profile;
determining minimum and maximum addresses of a display range in which said guide is displayed, based on the position of said movable object;
substituting the minimum address of said display range in an address variable;
subtracting height data of said movable object from height data of said terrain profile which corresponds to an address indicated by said address variable thereby to correct the height data of said terrain profile with respect to the height data of said movable object;
determining luminance data corresponding to the corrected height data;
incrementing a value of said address variable;
determining whether the value of said address variable falls within said display range; and
issuing a graphic command to display a line on said terrain profile at a position represented by said value of said address if the value of said address variable is determined as falling within said display range.

23. A method according to claim 22, wherein said step of determining luminance data includes the step of limiting the luminance data between upper and lower limit values.

24. A method of displaying a guide in a display space in a video game system for displaying image information indicative of a terrain profile and image information of a movable object on a display screen, and moving the movable object on the display screen based on the image information indicative of the terrain profile and a command from a controller, comprising the steps of:
displaying a guide comprising a plurality of lines on the display screen based on said image information indicative of the terrain profile, if the command from the controller indicates display of the guide;

determining whether a flag has a value indicative of display of the guide or a value indicative of non-display of the guide;

if the flag has a value indicative of display of the guide, changing the value of the flag to the value indicative of non-display of the guide before minimum and maximum addresses of the terrain profile are stablished; and if the flag has a value indicative of non-display of the guide, changing the value of the flag to the value indicative of display of the guide, and issuing a command to erase the guide from the display screen.

25. A method of displaying a guide in a display space in a video game system for displaying image information indicative of a terrain profile and image information of a movable object on a display screen, said image information indicative of the terrain profile including information representative of the height of a vertex in which the vertex is a point on the terrain profile, and moving the movable object on a display screen based on a command from a controller, comprising the steps of:

displaying a guide comprising a plurality of lines on the display screen based on said image information indicative of the terrain profile, if the command from the controller indicates display of the guide;

establishing a luminance of each of said lines depending on the relationship between the height of a vertex corresponding to a starting point of the line and the height of a vertex corresponding to an ending point of the line, said luminance of each of said lines being determined such that the luminance is progressively lower from said starting point toward said ending point if the height of the vertex corresponding to the starting point is greater than the height of the vertex corresponding to the ending point and the luminance is progressively greater from said starting point toward said ending point if the height of the vertex corresponding to the starting point is smaller than the height of the, vertex corresponding to the ending point.

26. A method according to claim 25, further comprising the steps of:

establishing a direction in which said movable object is to move; and three-dimensionally displaying said image information indicative of the terrain profile and said guide on said display screen depending on the established direction.

27. A method according to claim 25, further comprising the steps of:

three-dimensionally displaying said image information indicative of the terrain profile on said display screen; and three-dimensionally displaying said guide as a matrix of said lines over the three-dimensionally displayed image information indicative of the terrain profile on said display screen.

28. A method according to claim 25, wherein said image information indicative of the terrain profile comprises a plurality of polygons, and said lines displayed as the guide extend between vertices of said polygons.

29. A method according to claim 25, wherein said video game system comprises a golf game system, said image information indicative of the terrain profile comprises image information indicative of a golf course, and said image information of a movable object comprises image information of a golf ball.

30. A recording medium having recorded therein game program data fro displaying image information indicative of a terrain profile and image information of a movable object on a display screen, said image information indicative of the terrain profile including information representative of the height of a vertex in which a vertex is a point on the terrain, moving the movable object on the display screen based on the image information indicative of the terrain profile and a command from a controller, displaying a guide comprising a plurality of lines on the display screen, and establishing a luminance and a length of each of said lines based on the image information indicative of the terrain profile, said image information indicative of the terrain profile including information representative of the height of a vertex in which a vertex is a point on the terrain profile, the luminance of each of said lines being established depending on the relationship between the height of a vertex corresponding to a vertex corresponding to a starting point of the line and the height of a vertex corresponding to an ending point of the line, said luminance of each of said lines being established such that the luminance is progressively lower from said starting point toward said ending point if the height of the vertex corresponding to the starting point is greater than the height of the vertex corresponding to the ending point and the luminance is progressively greater from said starting point toward said ending point if the height of the vertex corresponding to the starting point is smaller than the height of the vertex corresponding to the ending point.

31. A recording medium having recorded therein game program data for displaying image information indicative of a terrain profile and image information of a movable object on a display screen and moving the movable object on the display screen based on the image information indicative of the terrain profile and a command from a controller, said game program including the step of:

displaying a guide comprising a plurality of lines on the display screen based on said image information indicative of the terrain profile, if the command from the controller indicates display of the guide;

establishing minimum and maximum, addresses of the terrain profile;

determining minimum and maximum addresses of a display range in which said guide is displayed, based on the position of said movable object;

substituting the minimum address of said display range in an address variable;

subtracting height data of said movable object from height data of said terrain profile which corresponds to an address indicated by said address variable thereby to correct the height data of said terrain profile with respect to the height data of said movable object;

determining luminance data corresponding to the corrected height data;

incrementing a value of said address variable;

determining whether the value of said address variable falls within said display range; and issuing a graphic command to display a line on said terrain profile at a position represented by said value of said address if the value of said address variable is determined as falling within said display range.

32. A recording medium according to claim 31, wherein said step of determining the luminance data includes the step of limiting the luminance data between upper and lower limit values.

33. A recording medium having recorded therein game program data for displaying image information indicative of a terrain profile and image information of a movable object on a display screen and moving the movable object on the display screen based on the image information indicative of the terrain profile and a command from a controller, said game program including the step of:

displaying a guide comprising a plurality of lines on the display screen based on said image information indicative of the terrain profile, if the command from the controller indicates display of the guide;

determining whether a flag has a value indicative of display of the guide or a value indicative of non-display of the guide;

if the flag has a value indicative of display of the guide, changing the value of the flag to the value indicative of non-display of the guide before said minimum and maximum addresses of the terrain profile are established; and if the flag has a value indicative of non-display of the guide, changing the value of the flag to the value indicative of display of the guide, and issuing a command to erase the guide from the display screen.

34. A recording medium according to claim 33, wherein said image information indicative of the terrain profile is three-dimensionally displayed on said display screen, and said guide is three-dimensionally displayed as a matrix of said lines over the three-dimensionally displayed image information indicative of the terrain profile on said display screen.

35. A recording medium according to claim 33, wherein said image information indicative of the terrain profile comprises a plurality of polygons, and said lines displayed as the guide extend between vertices of said polygons.

36. A recording medium according to claim 33, wherein said game program data comprises program data for a golf game, said image information indicative of the terrain profile comprises image information indicative of a golf course, and said image information of a movable object comprises image information of a golf ball.

37. A recording medium having recorded therein game program data for displaying image information indicative of a terrain profile and image information of a movable object on a display screen and moving the movable object on the display screen based on the image information indicative of the terrain profile and a command from a controller, said image information indicative of the terrain profile including information representative of the height of a vertex in which the vertex is a point on the terrain profile, said game program including the step of displaying a guide comprising a plurality of lines on the display screen based on said image information indicative of the terrain profile, if the command from the controller indicates display of the guide, a luminance of each of said lines being established depending on the relationship between the height of a vertex corresponding to a starting point of the line and the height of a vertex corresponding to an ending point of the line, said luminance of each of said lines being established such that the luminance is progressively lower from said starting point toward said ending point if the height of the vertex corresponding to the starting point is greater than the height of the vertex corresponding to the ending point and the luminance is progressively greater from said starting point toward said ending point if the height of the vertex corresponding to the starting point is smaller than the height of the vertex corresponding to the ending point.

* * * * *